(12) United States Patent
Hanafusa

(10) Patent No.: US 8,333,673 B2
(45) Date of Patent: Dec. 18, 2012

(54) DRIVE SHAFT ROTATION DIRECTION SWITCHING DEVICE

(75) Inventor: Jitsumi Hanafusa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 560 days.

(21) Appl. No.: 11/987,051

(22) Filed: Nov. 27, 2007

(65) Prior Publication Data

US 2008/0125254 A1    May 29, 2008

(30) Foreign Application Priority Data

Nov. 27, 2006  (JP) ............................... P2006-318804

(51) Int. Cl.
*F16H 59/00*  (2006.01)

(52) U.S. Cl. .......................................................... 474/5
(58) Field of Classification Search .................... 474/5
See application file for complete search history.

(56) References Cited

U.S. PATENT DOCUMENTS

| 2,924,982 | A | | 2/1960 | Harrer | |
|---|---|---|---|---|---|
| 3,722,277 | A | * | 3/1973 | Fell et al. ............................. | 474/5 |
| 3,796,275 | A | * | 3/1974 | Bouyer ............................. | 180/6.4 |
| 4,634,403 | A | * | 1/1987 | Peabody et al. .................... | 474/1 |
| 4,696,661 | A | | 9/1987 | Rehlander | |
| 5,393,270 | A | * | 2/1995 | Grobbelaar ....................... | 474/5 |
| 5,679,083 | A | * | 10/1997 | Eom ................................ | 474/5 |

FOREIGN PATENT DOCUMENTS

| EP | 0 564 221 A1 | 10/1993 |
|---|---|---|
| EP | 0 785 376 A2 | 7/1997 |
| FR | 2 667 123 A1 | 3/1992 |
| JP | 61-109947 | 5/1986 |
| JP | 63-223207 A | 9/1988 |
| JP | 2001-021015 | 1/2001 |

\* cited by examiner

*Primary Examiner* — Michael Mansen
*Assistant Examiner* — Robert T Reese
(74) *Attorney, Agent, or Firm* — Arent Fox LLP

(57) ABSTRACT

A rotation direction switching device for switching the rotation direction of a drive shaft includes a pulley unit for switching the rotation direction of the drive shaft. The pulley unit has a forward rotation drive belt and a reverse rotation drive belt. The forward rotation drive belt extends between the forward rotation drive pulley and a forward rotation driven pulley. The reverse rotation drive belt extends between a reverse rotation drive pulley and a reverse rotation driven pulley. When the drive shaft is forwardly rotated, the forward rotation belt is placed in a tensioned state, and the reverse rotation belt is switched to a relaxed state. When the drive shaft is reversely rotated, the reverse rotation belt is placed in a tensioned state, and the forward rotation belt is switched to a relaxed state.

5 Claims, 22 Drawing Sheets

DRIVE SHAFT ROTATION DIRECTION SWITCHING DEVICE

FIELD OF THE INVENTION

The present invention relates to a rotation direction switching device that is disposed between a drive shaft and a drive power source and is used for switching the rotation direction of the drive shaft to forward rotation and reverse rotation.

BACKGROUND OF THE INVENTION

A conventional snow remover is known in which a gear drive is employed as the travel drive system. In the transition between forward and backward travel in this snow remover, a clutch lever is operated to place a travel clutch in a temporarily disconnected state. A lever for switching between forward and backward travel is then operated to vary the meshing of the gear drive system, whereby the rotation of a drive shaft is switched to forward rotation or reverse rotation.

A snow remover in which forward and backward travel are switched by switching the rotation of the drive shaft between forward rotation and reverse rotation is disclosed in Japanese Laid-open Patent Application No. 63-223207, for example.

In the abovementioned snow remover, forward and backward travel must be switched after the travel clutch is placed in the disconnected state, and it is therefore difficult to smoothly switch the snow remover to forward or backward travel.

A snow remover is also known in which a hydraulic drive is employed as the travel drive system. In order to switch this hydraulically driven snow remover to forward or backward travel, the rotation of the drive shaft is switched to forward rotation or reverse rotation, and the remover is made to travel forward or backward, merely by operating a lever for switching between forward and backward travel.

However, the hydraulically driven snow remover described above has a complex structure and requires precision parts. The cost of the snow remover is therefore difficult to reduce.

SUMMARY OF THE INVENTION

An object of the present invention is to provide a device for switching the rotation direction of a drive shaft in which the device has a simple structure and can smoothly switch the rotation direction of the drive shaft.

According to an aspect of the present invention, there is provided a rotation direction switching device that is disposed in a drive power transmission path from a drive power source to a drive shaft and is used for switching a rotation direction of the drive shaft to forward rotation and reverse rotation, wherein the rotation direction switching device comprises a forward rotation drive pulley and a reverse rotation drive pulley connected to an output shaft of the drive power source; a forward rotation driven pulley and a reverse rotation driven pulley connected to the drive shaft; a forward rotation drive belt extending between the forward rotation drive pulley and the forward rotation driven pulley; a reverse rotation drive belt extending between the reverse rotation drive pulley and the reverse rotation driven pulley; belt switching means for switching one drive belt among the forward rotation drive belt and the reverse rotation drive belt to a tensioned state and the other drive belt to a relaxed state; and a gear mechanism for forwardly rotating the drive shaft when the forward rotation drive belt is switched to the tensioned state, and reversely rotating the drive shaft when the reverse rotation drive belt is switched to the tensioned state.

In the present invention, the belt switching means switches one drive belt among the forward rotation drive belt and the reverse rotation drive belt to a tensioned state and the other drive belt to a relaxed state.

The drive shaft is forwardly rotated when the forward rotation drive belt is switched to the tensioned state. The drive shaft is reversely rotated when the reverse rotation drive belt is switched to the tensioned state.

The drive shaft can therefore be switched to the forward rotation state and the reverse rotation state without operating a clutch, merely by switching the forward rotation drive belt or the reverse rotation drive belt to the tensioned state through the use of the belt switching means.

The rotation direction of the drive shaft can thereby be smoothly switched.

Since the drive shaft can be switched to the forward rotation state and the reverse rotation state merely by switching the drive belt to the tensioned state or the relaxed state, the structure of the rotation direction switching device can be simplified.

In a preferred form of the present invention, one each of the forward rotation and reverse rotation drive pulleys and the forward rotation and reverse rotation driven pulleys is provided to a single shaft, and the other is provided to a first or second shaft; the first and second shafts are provided to a rotary body that is capable of rotating so that one of the first and second shafts separates from the single shaft, and the other of the first and second shafts approaches the single shaft; the drive belt on the pulley of one of the shafts is maintained in the tensioned state by separation of the one shaft from the single shaft; and the drive belt on the other shaft is maintained in the relaxed state by the approaching of the other shaft to the single shaft. A configuration is thus adopted in the present invention whereby one shaft among the first and second shafts separates from the single shaft, and the other shaft approaches the same shaft through the rotation of the rotary body.

One of the shafts is thus separated from the single shaft, whereby the drive belt wrapped around the pulley of one of the shafts is maintained in the tensioned state. Furthermore, the other shaft is caused to approach the single shaft, whereby the drive belt wrapped around the pulley of the other shaft is maintained in the relaxed state. Since the drive shaft can be switched to the forward rotation state and the reverse rotation state merely by the rotation of the rotary body, the structure of the rotation direction switching device can be simplified.

Preferably, the belt switching means is provided with a spring for maintaining a tensioned state in the drive belt on the pulley of the one shaft.

Generally, in order to transfer the rotation of the drive pulleys to the driven pulleys when the drive belt is used, pressure must be applied to the drive belt, and the drive belt must be maintained in the tensioned state. A tension pulley or other pressuring means is provided to the side of the drive belt in order to apply pressure to the drive belt.

When both a forward rotation drive belt and a reverse rotation drive belt are provided, the pressuring means is thus required for each drive belt. The structure of the belt switching means is therefore complicated.

Therefore, a configuration is adopted in the present invention in which a spring for maintaining a tensioned state in the drive belt on the pulley of one of the shafts is provided to the belt switching means. This spring maintains a tensioned state in any (one) drive belt selected from the forward rotation drive belt and the reverse rotation drive belt. There is therefore no need to provide a separate pressuring means for tensioning to the forward rotation drive belt and the reverse rotation drive belt, and the structure can be simplified.

In a preferred form, the spring in the belt switching means is connected to the rotary body via a connecting member, and the connecting member has an interference prevention part formed so as to prevent interference with a rotary shaft that is a center of rotation of the rotary body.

The first and second shafts in this arrangement are provided to the rotary body. One of the shafts can be separated from the single shaft through the rotation of the rotary body about the rotary shaft. In order to maintain a tensioned state in any (one) drive belt selected from the forward rotation drive belt and the reverse rotation drive belt, one side or the other side of the rotary shaft is arbitrarily selected, and the urging force of the spring must be applied to each side. The spring may therefore interfere with the rotary shaft.

The spring is therefore connected to the rotary body via a connecting member in the present invention. The interference prevention part for preventing interference with the rotary shaft is also formed in the connecting member.

The spring member can thus be prevented from interfering with the rotary shaft when the rotary body is rotated. The urging force of the spring can thereby be applied to each side when one or the other side of the rotary shaft is arbitrarily selected, and a tensioned state can be maintained in any (one) drive belt selected from the forward rotation drive belt and the reverse rotation drive belt.

Preferably, the pulley provided to the single shaft comprises the forward rotation and reverse rotation drive pulley.

In this arrangement, pulleys provided to the same shaft are relatively free of the need for adjustment or maintenance. In contrast, since the pulleys provided to the first and second shafts are supported by the rotary body, these pulleys require adjustment or maintenance.

Therefore, in the present invention, pulleys provided to the same shaft are drive pulleys for forward rotation and reverse rotation. The pulleys provided to the same shaft can thus be disposed toward the drive power source, and the pulleys provided to the first and second shafts can be disposed away from the drive power source.

The drive power source thus does not hinder adjustment or maintenance on the side of the pulleys provided to the first and second shafts. Adjustment or maintenance on the side of the pulleys provided to the first and second shafts can therefore be easily performed.

Desirably, the pulleys provided to the first and second shafts are the forward rotation and reverse rotation drive pulleys.

Since the drive power source rotates at a relatively high speed, the rotation of the drive power source must be decelerated to the desired rotation by the gear mechanism.

The diameter of a gear provided to the forward rotation and reverse rotation drive pulleys can be increased to decelerate the forward rotation and reverse rotation drive pulleys to the desired rotation.

The forward rotation and reverse rotation drive pulleys can thereby be separated so as not to interfere with each other in a state in which the gear provided to the forward rotation drive pulley, as well as the gear provided to the reverse rotation drive pulley, are meshed with each other.

The gear provided to the forward rotation drive pulley, and the gear provided to the reverse rotation drive pulley are thus meshed with each other, whereby the gear provided to the forward rotation drive pulley can also be used as an idler gear for reversely rotating the gear provided to the reverse rotation drive pulley. Consequently, the number of gears in the gear mechanism can be reduced.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 21:
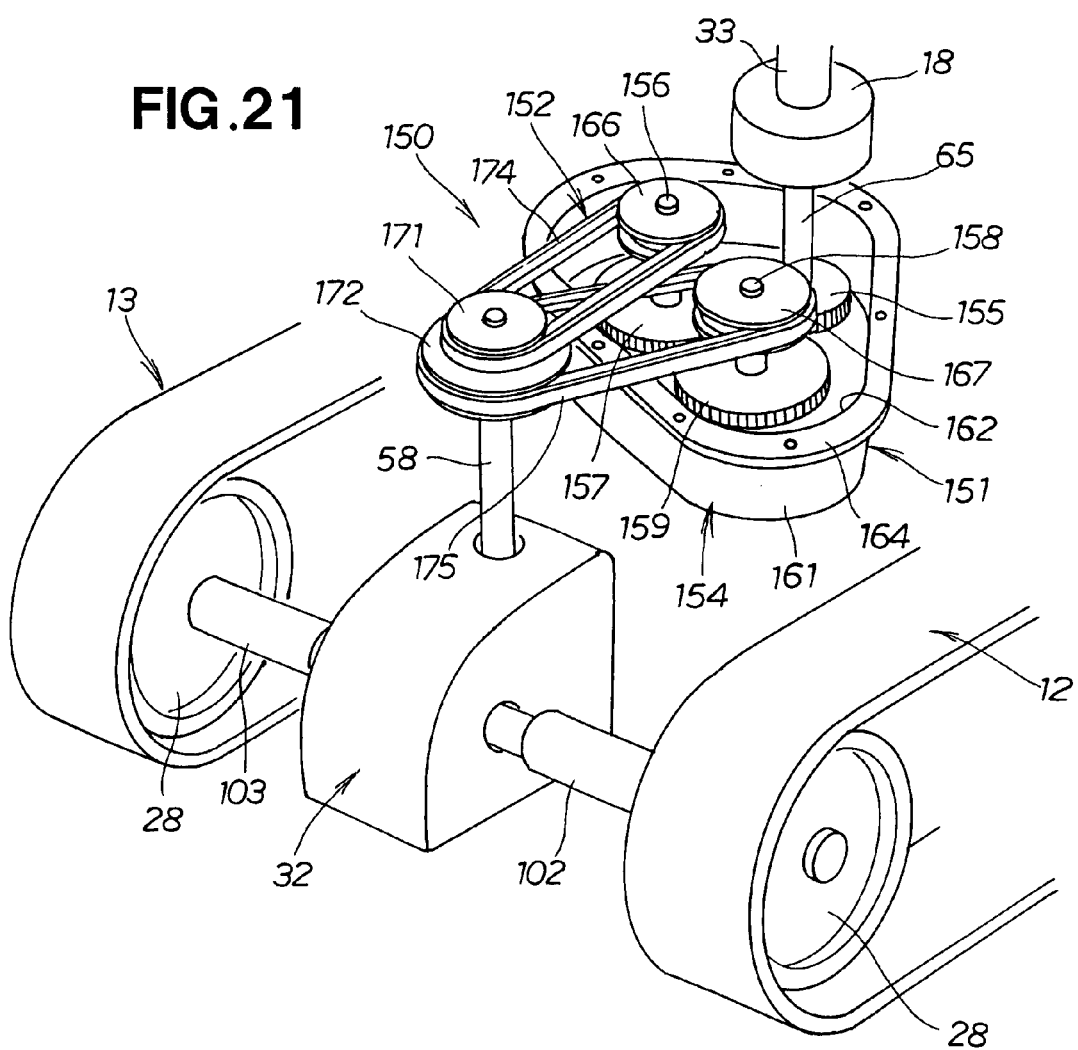
FIG. 21 is a perspective view showing the rotation direction switching device according to a second embodiment of the present invention.

FIGS. 1 through 18 show a rotation direction switching device according to a first embodiment, while FIGS. 21 through 23 show a rotation direction switching device according to a second embodiment.

Figure 1:
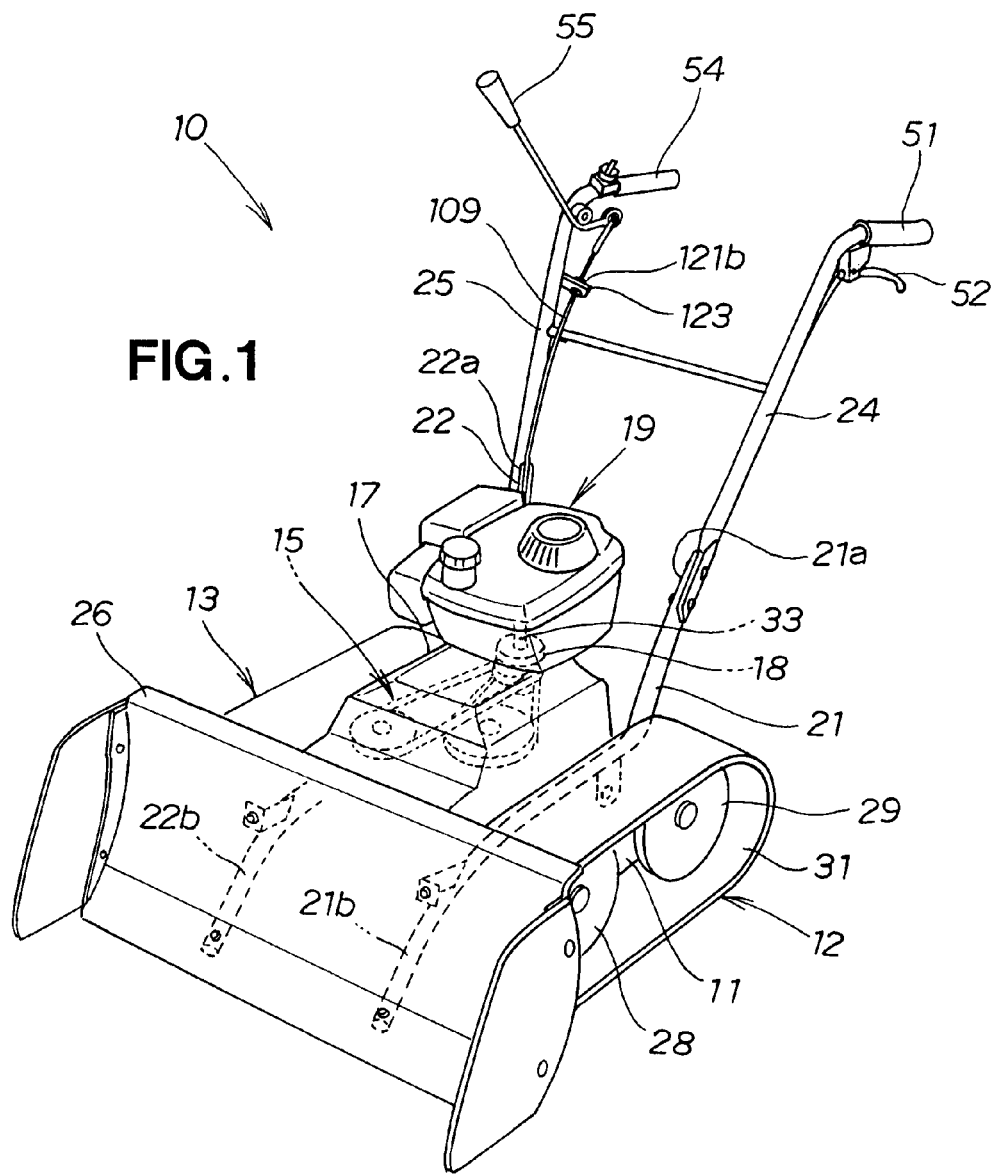
FIG. 1 is a perspective view of a walk-behind snow remover provided with the rotation direction switching device according to a first embodiment of the present invention.

The walk-behind snow remover 10 shown in FIG. 1 has left and right crawler travel units 12, 13 provided on the left and right of a machine body 11. The rotation direction switching device 15 is covered by a cover 17, and the left and right crawler travel units 12, 13 switch the rotation direction. An engine 19 (drive power source) transfers rotation to the rotation direction switching device 15 via a travel clutch 18. Left and right handles 24, 25 are attached to the rear end parts 21a, 22a of left and right swing pipes 21, 22, respectively. A snow discharge plate 26 is provided to the front end parts 21b, 22b of the left and right swing pipes 21, 22.

The left crawler travel unit 12 is composed of a drive wheel 28, a driven wheel 29, and a crawler belt 31 that extends between the drive wheel 28 and the driven wheel 29. The drive wheel 28 is connected to the engine 19 via the rotation direction switching device 15 and other components.

The right crawler travel unit 13 is a member having left-right symmetry with the left crawler travel unit 12, and the same reference symbols are used to refer to the constituent members thereof No description thereof will be given.

Figure 2:
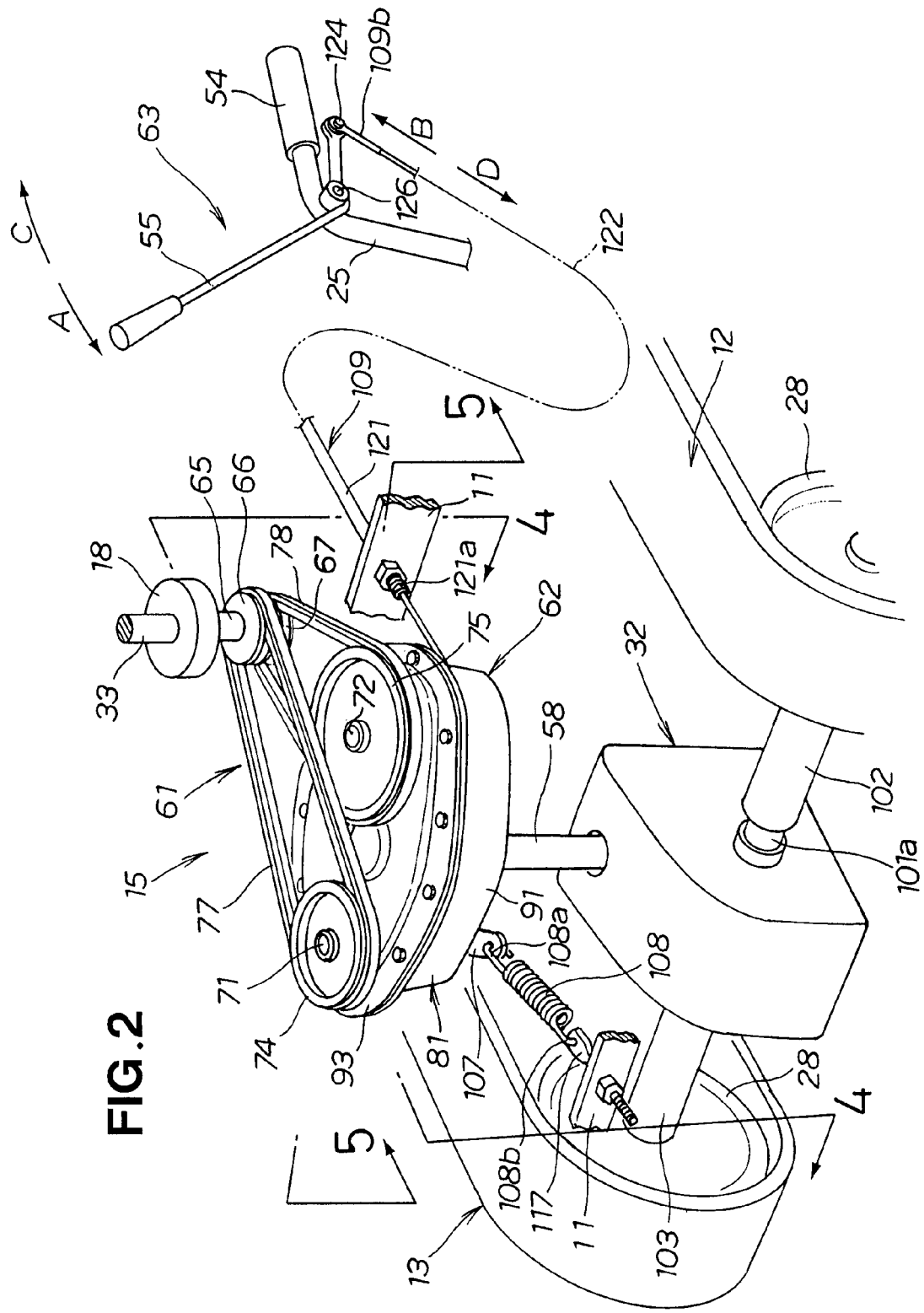
FIG. 2 is a perspective view of the rotation direction switching device shown in FIG. 1.

The rotation direction switching device 15 is connected to the left and right crawler travel units 12, 13 via a final drive mechanism 32 (FIG. 2).

The rotation of the engine 19 is transmitted to the left and right crawler travel units 12, 13 via the travel clutch 18, the rotation direction switching device 15, and the final drive mechanism 32.

The cover 17 is disposed between the left and right crawler travel units 12, 13 so as to cover the rotation direction switching device 15. The cover 17 is also attached to the machine body 11.

The engine 19 has a crankshaft 33 as an output shaft, and the engine 19 is a longitudinally oriented vertical engine in which the crankshaft 33 extends downward.

The left handle 24 extends at an upward incline towards the rear of the vehicle body from the rear end part 21a of the left swing pipe 21 and has a left grip 51 at the rear end part thereof, and a travel clutch lever 52 is provided in the vicinity of the left grip 51. The travel clutch lever 52 is a lever for switching the travel clutch 18 to a connected state and a disconnected state.

The right handle 25 extends at an upward incline towards the rear of the vehicle body from the rear end part 22a of the right swing pipe 22 and has a right grip 54 at the rear end part thereof, and a forward/backward travel switching lever 55 is provided in the vicinity of the right grip 54. The forward/backward travel switching lever 55 constitutes a portion of the rotation direction switching device 15.

The walk-behind snow remover 10 travels forward through the forward rotation of the left and right crawler travel units 12, 13, and travels backward through the reverse rotation of the left and right crawler travel units 12, 13 in a state in which the left and right grips 51, 54 are grasped in the left and right hands.

Figure 3:
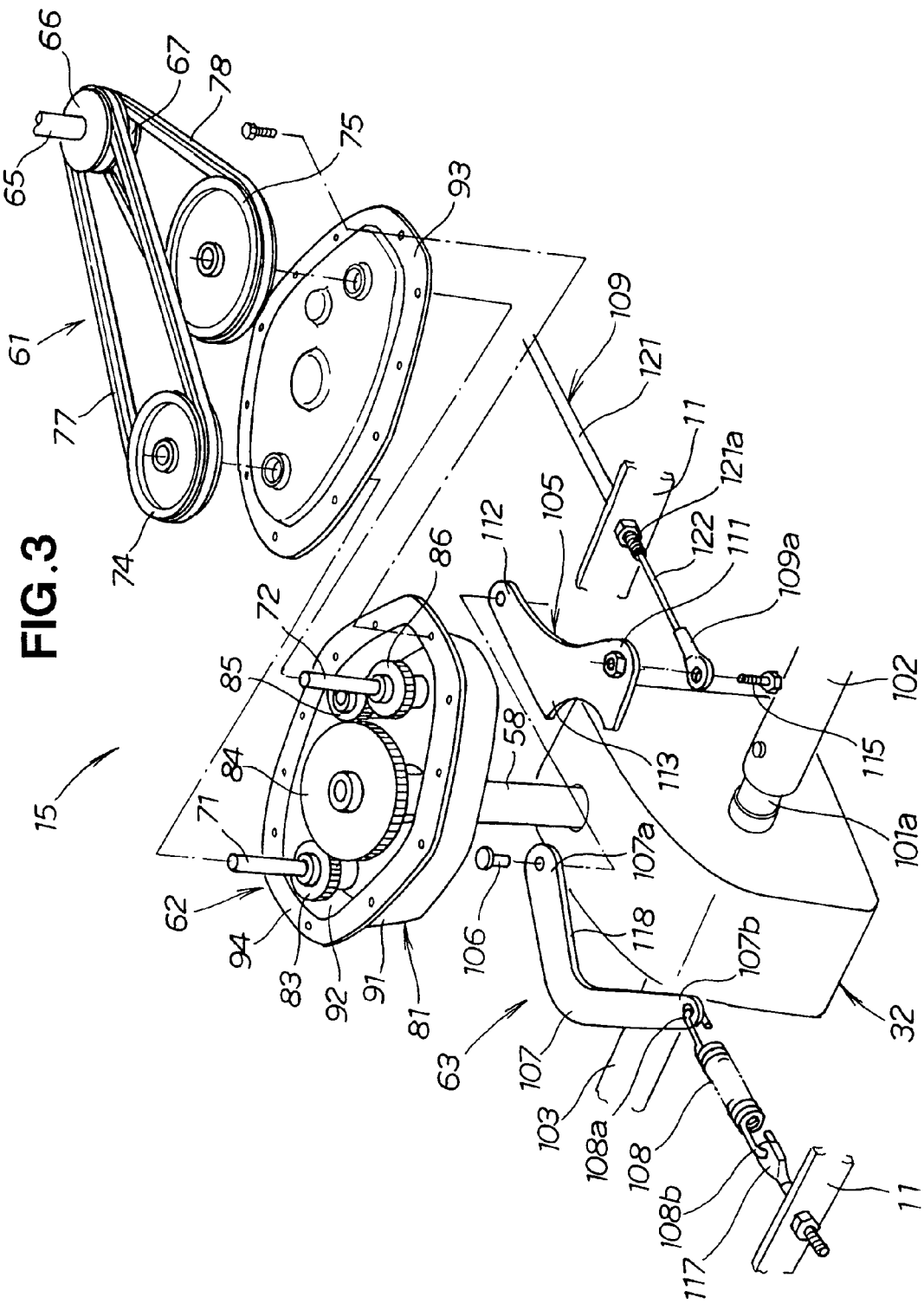
FIG. 3 is an exploded perspective view of the rotation direction switching device shown in FIG. 2.

As shown in FIGS. 2 and 3, the rotation direction switching device 15 is disposed in the path of drive power transmission from the engine 19 shown in FIG. 1 to an input shaft (drive shaft) 58, and switches the rotation direction of the input shaft 58 to forward rotation and reverse rotation.

This rotation direction switching device 15 has a pulley unit 61 connected to the travel clutch 18; a gear unit (gear mechanism) 62 connected to the pulley unit 61; and a belt switching means 63 for switching the connection to the pulley unit 61.

The travel clutch 18 is connected to an output shaft (crankshaft) 33 of the engine 19 shown in FIG. 1.

The pulley unit 61 has a drive shaft (same shaft) 65 connected to the travel clutch 18; a forward rotation drive pulley 66 and a reverse rotation drive pulley 67 that are provided to the drive shaft (same shaft) 65; a forward rotation (first other shaft) 71 and a reverse rotation shaft (second other shaft) 72 connected to the gear unit 62; a forward rotation driven pulley 74 provided to the forward rotation shaft 71; a reverse rotation driven pulley 75 provided to the reverse rotation shaft 72; a forward rotation drive belt 77 that extends between the forward rotation drive pulley 66 and the forward rotation driven pulley 74; and a reverse rotation drive belt 78 that extends between the reverse rotation drive pulley 67 and the reverse rotation driven pulley 75.

The forward rotation drive pulley 66 and the reverse rotation drive pulley 67 are integrally formed so that the forward rotation drive pulley 66 is above and the reverse rotation drive pulley 67 is below (see FIG. 4).

The forward rotation driven pulley 74 is disposed at the same height (horizontal position) as the forward rotation drive pulley 66, and is connected to the input shaft 58 via the forward rotation shaft 71 and the gear unit 62.

The reverse rotation driven pulley 75 is disposed at the same height (horizontal position) as the reverse rotation drive pulley 67, and is connected to the input shaft 58 via the reverse rotation shaft 72 and the gear unit 62.

The pulley unit 61 transfers the rotation of the forward rotation drive pulley 66 to the forward rotation driven pulley 74 via the forward rotation drive belt 77 in a state in which the forward rotation drive belt 77 is tensioned.

In the state in which the forward rotation drive belt 77 is relaxed, the forward rotation drive pulley 66 idles (spins idle), and the rotation of the forward rotation drive pulley 66 is not transferred to the forward rotation driven pulley 74 via the forward rotation drive belt 77.

The pulley unit 61 transfers the rotation of the reverse rotation drive pulley 67 to the reverse rotation driven pulley 75 via the reverse rotation drive belt 78 in a state in which the reverse rotation drive belt 78 is tensioned.

In the state in which the reverse rotation drive belt 78 is relaxed, the reverse rotation drive pulley 67 idles (spins idle), and the rotation of the reverse rotation drive pulley 67 is not transferred to the reverse rotation driven pulley 75 via the reverse rotation drive belt 78.

The gear unit 62 has a rotary case (rotary body) 81 that is supported so as to be able to rotate about the input shaft 58 as a rotary shaft; a forward rotation drive gear 83 provided to the forward rotation shaft 71; a driven gear 84 provided to the input shaft 58 that meshes with the forward rotation drive gear 83; an idler gear 85 meshed with the driven gear 84; and a reverse rotation drive gear 86 provided to the reverse rotation shaft 72 that meshes with the idler gear 85.

The rotary case 81 has a case body 91 for housing the forward rotation drive gear 83, the driven gear 84, the idler gear 85, and the reverse rotation drive gear 86; and a case cover 93 for blocking the open part 92 of the case body 91. The case cover 93 is bolted to the opening edge part 94 of the case body 91.

Figure 4:
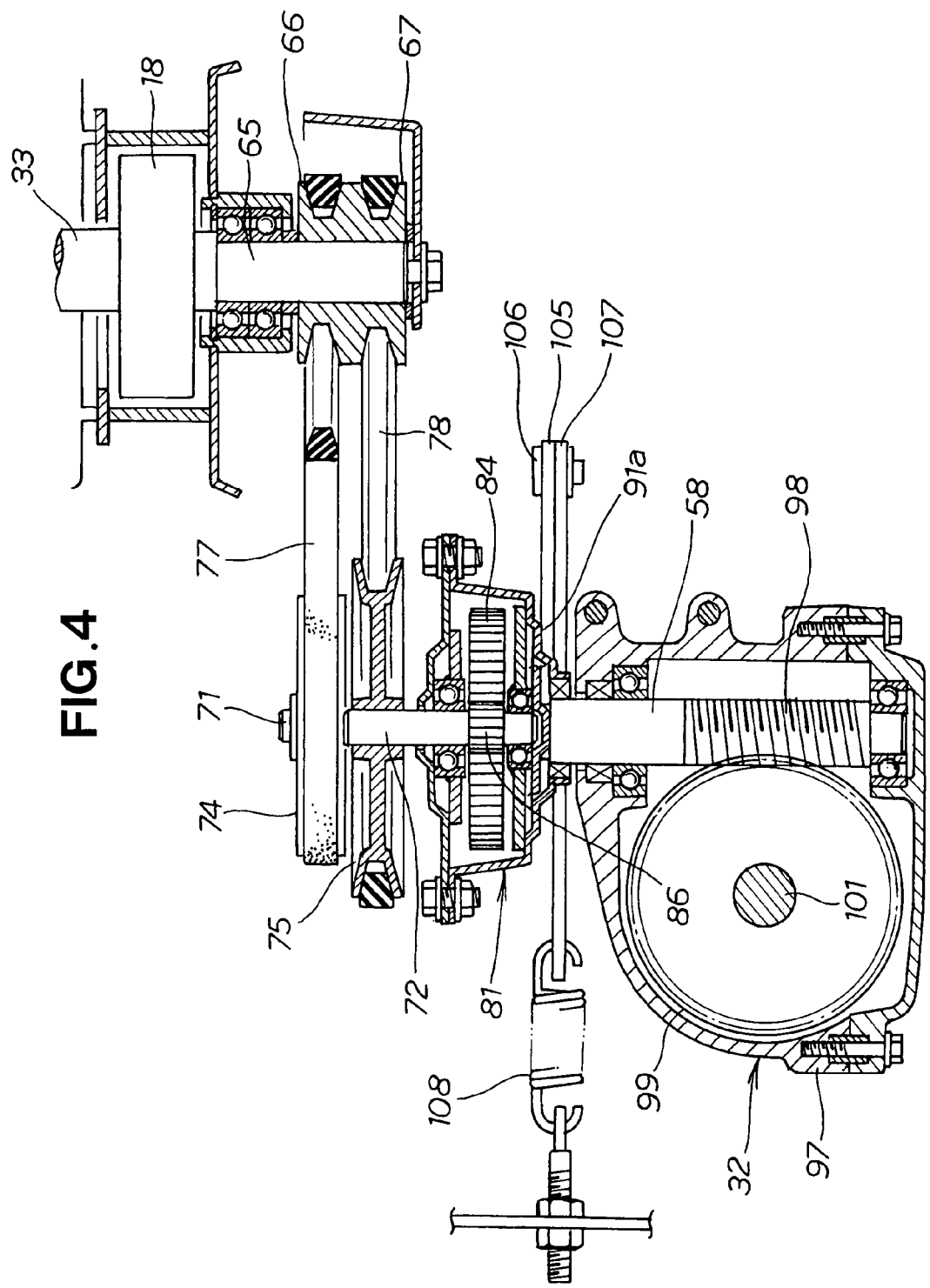
FIG. 4 is a sectional view taken along line 4-4 in FIG. 2.
Figure 5:
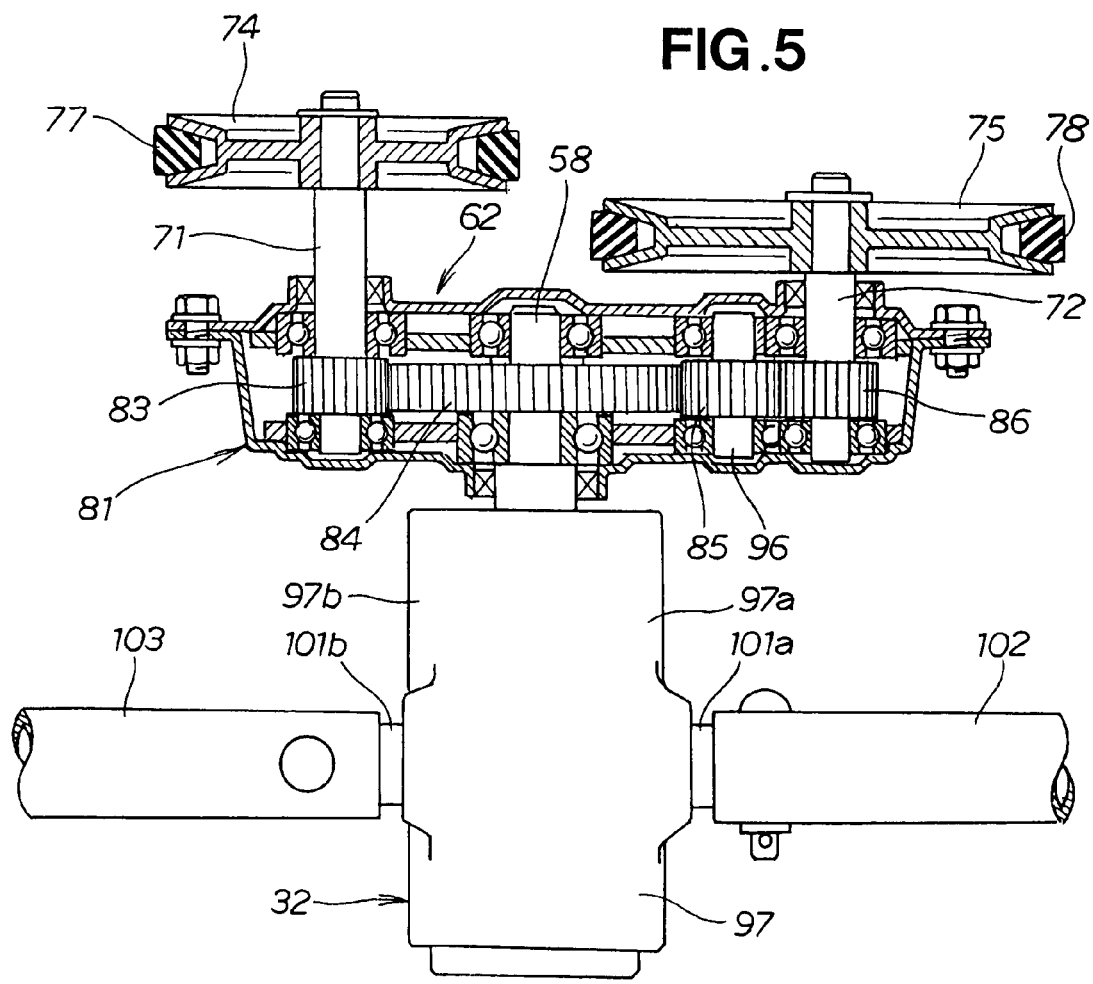
FIG. 5 is a sectional view taken along line 5-5 in FIG. 2.

As shown in FIGS. 4 and 5, the forward rotation drive gear 83 is supported by the rotary case 81 so as to be able to rotate about the forward rotation shaft 71.

The driven gear 84 is supported by the rotary case 81 so as to be able to rotate about the input shaft 58.

The idler gear 85 is supported by the rotary case 81 so as to be able to rotate about a middle shaft 96.

The reverse rotation drive gear 86 is supported by the rotary case 81 so as to be able to rotate about the reverse rotation shaft 72.

The gear unit 62 forwardly rotates the input shaft 58 in a state in which the forward rotation drive belt 77 is tensioned.

The gear unit 62 reversely rotates the input shaft 58 in a state in which the reverse rotation drive belt 78 is tensioned.

The final drive mechanism 32 is supported so as to be able to rotate inside a final drive case 97, and is provided with the input shaft 58 in which a worm 98 is formed in the lower half; a worm wheel 99 that meshes with the worm 98; and a travel shaft 101 supported by the final drive case 97 so as to be able to rotate. The worm wheel 99 is provided to the travel shaft 101.

The left end part 101a of the travel shaft 101 protrudes to the outside from the left side part 97a of the final drive case 97. The right end part 101b protrudes to the outside from the right side part 97b of the final drive case 97.

A left travel pipe 102 is connected to the left end part 101a. The left travel pipe 102 is connected to the drive wheel 28 (FIG. 1) of the left crawler travel unit 12.

A right travel pipe 103 is connected to the right end part 101b. The right travel pipe 103 is connected to the drive wheel 28 (FIG. 2) of the right crawler travel unit 13.

As shown in FIGS. 2 and 3, the belt switching means 63 has a switching lever 105 provided to a bottom part 91a (FIG. 4) of the rotary case 81; a connecting arm (connecting member) 107 connected to the switching lever 105 so as to be able to rotate via a connecting pin 106; a spring 108 connected to the connecting arm 107; a push-pull cable 109 connected to the switching lever 105; and the forward/backward travel switching lever 55 connected to the push-pull cable 109.

The switching lever 105 has first and second end parts 111, 112, and also has a fixed part 113 in which one lateral edge is formed in a substantially curved shape, and the other lateral edge is formed in a curved shape. The fixed part 113 is welded to the bottom part 91a of the rotary case 81, whereby the switching lever 105 is fixed to the bottom part 91a of the rotary case 81.

The front end part 109a of the push-pull cable 109 is connected by a bolt 115 to the first end part 111. The rear end part 107a of the connecting arm 107 is connected by the connecting pin 106 to the second end part 112.

The connecting arm 107 is formed in the shape of a dog leg, and has an interference prevention part (concave part) 118 formed in the lateral edge part that faces the input shaft 58.

The rear end part 107a of the connecting arm 107 is connected to the switching lever 105 by the connecting pin 106, and the front end part 107b retains one end 108a of the spring 108. The other end 108b of the spring 108 is retained by a locking member 117. The locking member 117 is screwed into the machine body 11.

The spring 108 urges in a direction in which one of the forward rotation drive belt 77 and the reverse rotation drive belt 78 is tensioned.

The push-pull cable 109 has an outer cable 121 and an inner cable 122. The front end part 121a of the outer cable 121 is attached to the machine body 11, and the rear end part 121b is attached to a bracket 123 (FIG. 1). The bracket 123 is attached to the right handle 25 shown in FIG. 1.

The inner cable 122 is attached so as to be able to move inside the outer cable 121.

The front end part 109a of the inner cable 122 protrudes forward from the front end part 121a of the outer cable 121, and is connected to the first end part 111 of the switching lever 105 by the bolt 115.

The rear end part 109b of the inner cable 122 protrudes to the rear from the rear end part 121b (FIG. 1) of the outer cable 121, and is connected to the forward/backward travel switching lever 55 by a bolt 124.

The forward/backward travel switching lever 55 is supported by the right handle 25 so as to be able to rotate via a supporting pin 126. The inner cable 122 is thus pulled as indicated by the arrow B when the forward/backward travel switching lever 55 is swung in the direction of the arrow A about the axis of the supporting pin 126. The rotation direction switching device 15 is switched to the forward travel state by the pulling of the inner cable 122 as indicated by the arrow B.

The inner cable 122 is pushed as indicated by the arrow D when the forward/backward travel switching lever 55 is swung in the direction of the arrow C about the axis of the supporting pin 126. The rotation direction switching device 15 is witched to the backward travel state by the pushing of the inner cable 122 as indicated by the arrow D.

The forward rotation drive pulley 66 and the reverse rotation drive pulley 67 provided to the drive shaft 65 require relatively no adjustment and maintenance.

In contrast, since the forward rotation driven pulley 74 provided to the forward rotation shaft 71, and the reverse rotation driven pulley 75 provided to the reverse rotation shaft 72 are supported by the rotary case 81, adjustment and maintenance thereof are necessary.

Therefore, in the first embodiment, the rotary case 81 or the forward and reverse rotation driven pulleys 74, 75 are disposed so as to be separated from the engine 19.

The engine 19 thus presents no hindrance when the cover 17 shown in FIG. 1 is removed, and adjustment or maintenance of the rotary case 81 or the forward and reverse rotation driven pulleys 74, 75 is performed.

The engine 19 also presents no hindrance when adjustment or maintenance of the forward rotation drive gear 83, the driven gear 84, the idler gear 85, the reverse rotation drive gear 86, and other components inside the rotary case 81 is performed.

An example in which the rotation direction switching device 15 is maintained in the forward travel state will next be described based on FIGS. 6 through 8.

Figure 6:
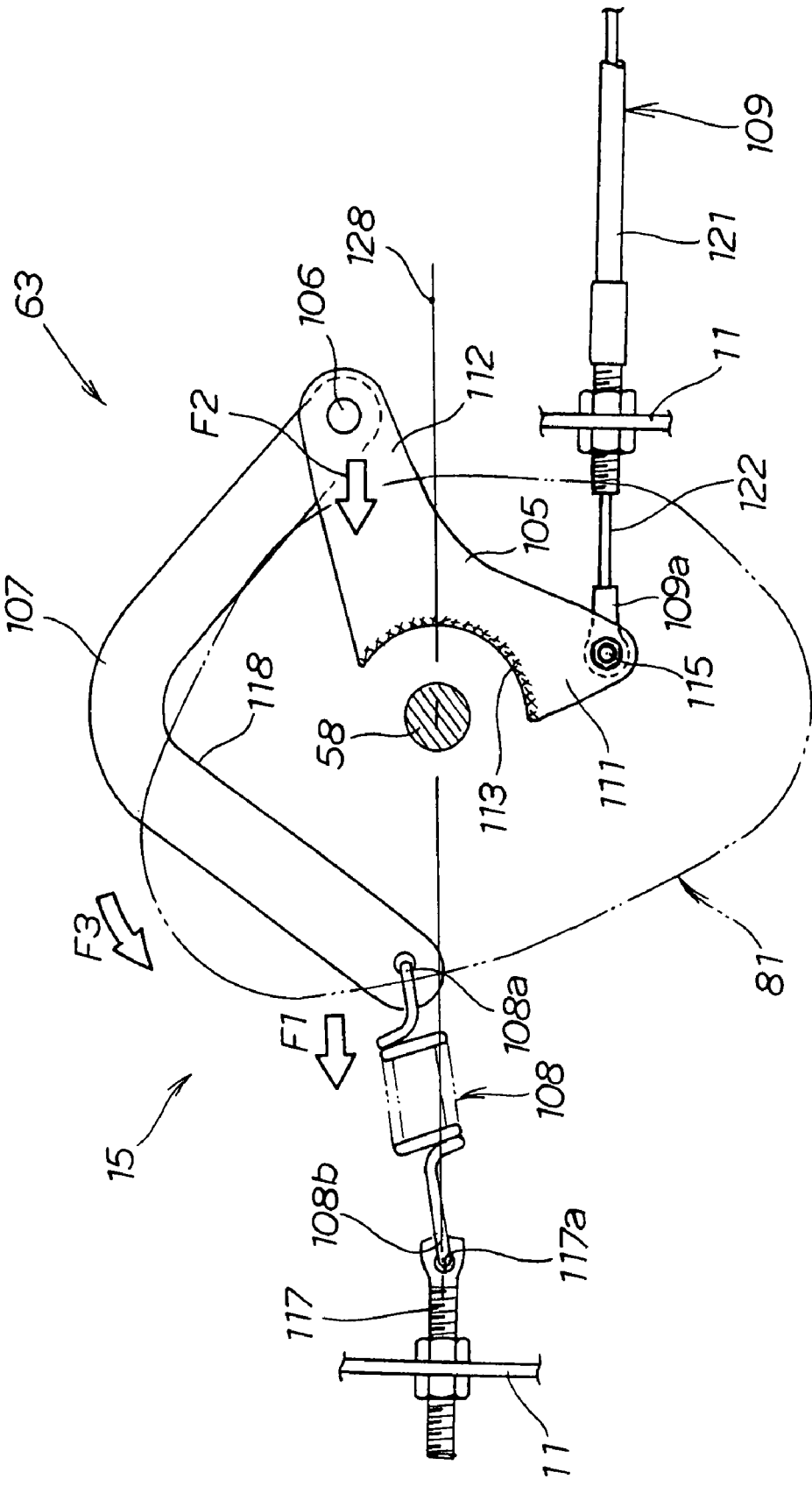
FIG. 6 is a plan view of an example in which the belt switching means shown in FIG. 3 is maintained in the forward travel state.

FIG. 6 shows an example in which the belt switching means 63 is maintained in the forward travel state.

When the rotation direction switching device 15 is placed in the forward travel state, the connecting pin 106 of the belt switching means 63 is positioned to the right of the center line 128.

The center line 128 is the line that links the input shaft 58 with the locking hole 117a of the locking member 117. The other end 108b of the spring 108 is locked into the locking hole 117a.

The tension force F1 of the spring 108 acts on the connecting arm 107 as indicated by the arrow. The acting tension force F1 is transmitted to the connecting pin 106 as a load via the connecting arm 107. The transmitted load is transmitted to the switching lever 105 as a load F2 via the connecting pin 106.

The load F2 is transmitted to the rotary case 81 through the switching lever 105, and a rotational force F3 acts on the rotary case 81 as indicated by the arrow.

Figure 7:
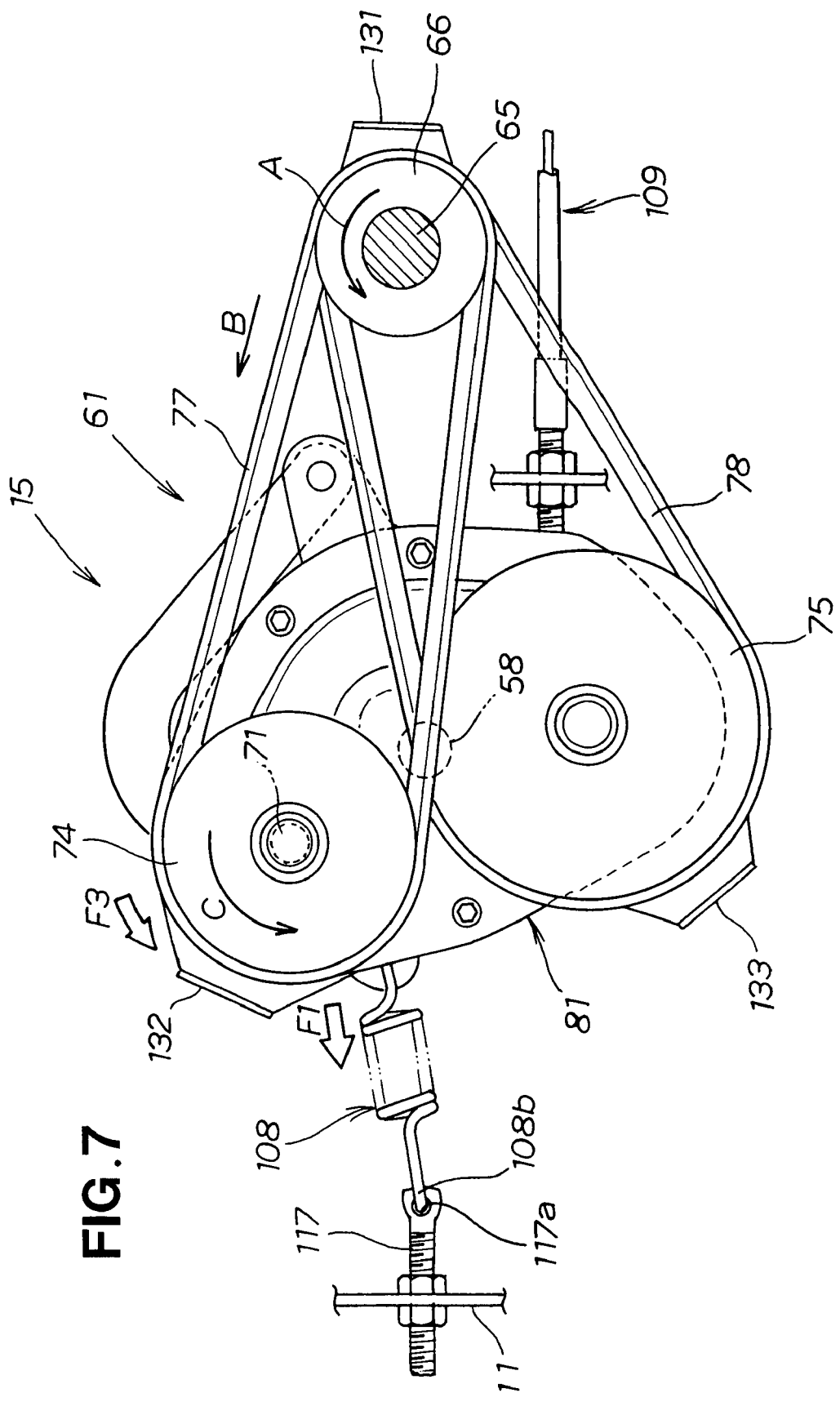
FIG. 7 is a top plan view of an example in which the pulley unit shown in FIG. 2 is maintained in the forward travel state.

FIG. 7 shows an example in which the pulley unit 61 is retained in the forward travel state.

The rotational force F3 acts on the rotary case 81 as indicated by the arrow, whereby the rotational force F3 acts on the forward rotation shaft 71. Specifically, the forward rotation shaft 71 is pulled in the direction away from the drive shaft 65 by the tension force F1 of the spring 108.

In this arrangement, the tension force F1 is adjusted so that the spring 108 exerts an appropriate tension force on the forward rotation drive belt 77.

The rotary case 81 is thus kept stationary in a state in which the appropriate tension force is applied to the forward rotation drive belt 77 (tensioned state). The rotary case 81 is maintained in the forward travel state.

Specifically, in the pulley unit 61 in the forward travel state, the forward rotation drive belt 77 is maintained in the tensioned state, and the reverse rotation drive belt 78 is maintained in the relaxed state.

When the engine 19 shown in FIG. 1 is driven, and the forward rotation drive pulley 66 is rotated as indicated by the arrow A, the rotation of the forward rotation drive pulley 66 is transferred to the forward rotation drive belt 77.

The forward rotation drive belt 77 is rotated as indicated by the arrow B, and the rotation of the forward rotation drive belt 77 is transferred to the forward rotation driven pulley 74.

The forward rotation driven pulley 74 thereby rotates as indicated by the arrow C, and the forward rotation shaft 71 rotates as indicated by the arrow C.

The reverse rotation driven pulley 75 moves towards the reverse rotation drive pulley 67 (FIG. 4).

Since the reverse rotation drive belt 78 is maintained in the relaxed state, the reverse rotation drive pulley 67 runs idle even when the reverse rotation drive pulley 67 rotates as indicated by the arrow A.

The rotation of the reverse rotation drive pulley 67 is thus not transferred to the reverse rotation driven pulley 75 via the reverse rotation drive belt 78.

The diagram shows a state in which the relaxed reverse rotation drive belt 78 is not separated from the reverse rotation drive pulley 67 or the reverse rotation driven pulley 75, but the reverse rotation drive belt 78 actually is separated from the reverse rotation drive pulley 67 or the reverse rotation driven pulley 75.

A member for retaining the relaxed drive belt to prevent the drive belt from separating from the drive pulley or the driven pulley will next be described.

A drive belt stopper 131 is provided to the forward rotation drive pulley 66 and the reverse rotation drive pulley 67.

A forward rotation driven belt stopper 132 is provided to the forward rotation driven pulley 74.

Furthermore, a reverse rotation driven belt stopper 133 is provided to the reverse rotation driven pulley 75.

The drive belt stopper 131 and the forward rotation driven belt stopper 132 prevent the forward rotation drive belt 77 from separating from the pulleys 66, 74 when the forward rotation drive belt 77 is maintained in the relaxed state.

The drive belt stopper 131 and the reverse rotation driven belt stopper 133 prevent the reverse rotation drive belt 78 from separating from the pulleys 67, 75 when the reverse rotation drive belt 78 is maintained in the relaxed state.

Figure 8:
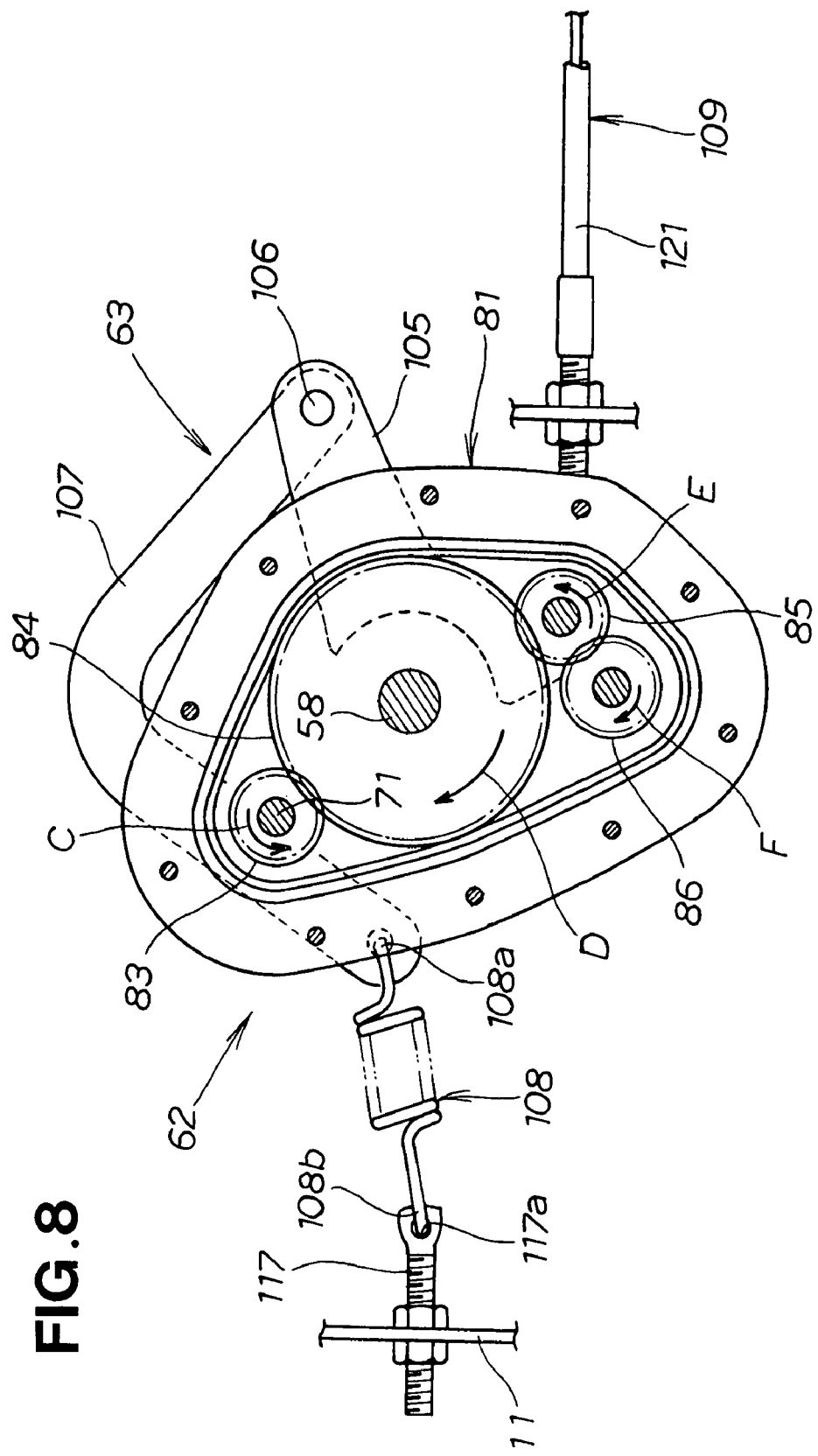
FIG. 8 is a top plan view of an example in which the gear unit shown in FIG. 3 is maintained in the forward travel state.

FIG. 8 shows an example in which the gear unit 62 is maintained in the forward travel state.

The forward rotation shaft 71 is rotated as indicated by the arrow C, whereby the forward rotation drive gear 83 rotates in integral fashion with the forward rotation shaft 71 as indicated by the arrow C. The forward rotation drive gear 83 rotates, whereby the driven gear 84 rotates as indicated by the arrow D.

The input shaft 58 rotates in integral fashion with the driven gear 84 as indicated by the arrow D, whereby the rotation of the input shaft 58 is transmitted to the left and right crawler travel units 12, 13 via the final drive mechanism 32 shown in FIG. 2. The walk-behind snow remover 10 shown in FIG. 1 thereby travels forward.

The idler gear 85 is rotated as indicated by the arrow E by the rotation of the driven gear 84. The reverse rotation drive gear 86 is rotated as indicated by the arrow F by the rotation of the idler gear 85.

The reverse rotation driven pulley 75 (FIG. 7) rotates integrally with the reverse rotation drive gear 86.

Since the reverse rotation drive belt 78 is maintained in the relaxed state, the reverse rotation driven pulley 75 shown in FIG. 7 rotates idly. The input shaft 58 can thereby be switched to a state of forward rotation merely by the rotation of the rotary case 81, and the structure of the rotation direction switching device 15 can therefore be simplified.

An example in which the rotation direction switching device 15 is maintained in the backward travel state will next be described based on FIGS. 9 through 11.

Figure 9:
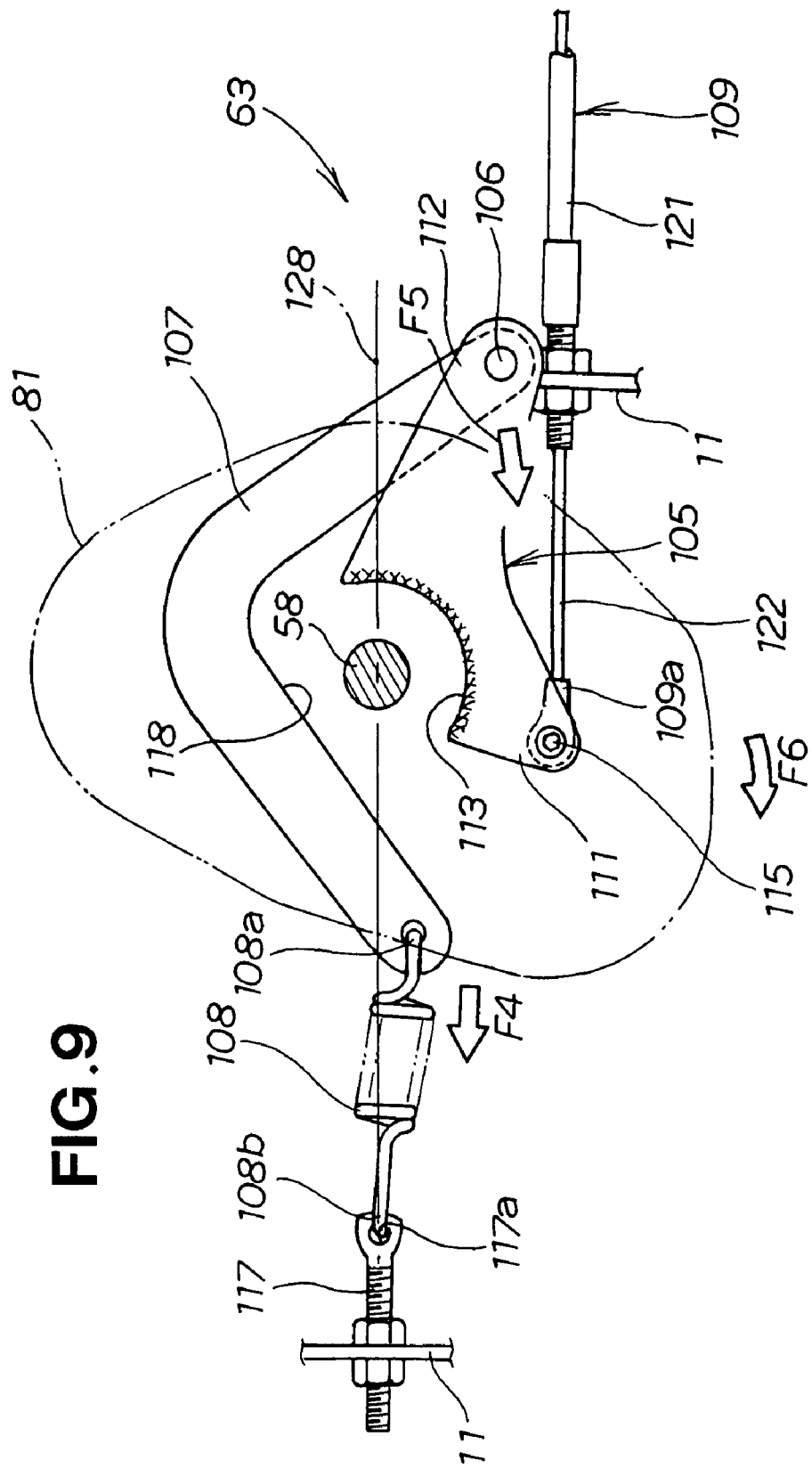
FIG. 9 is a top plan view of an example in which the belt switching means shown in FIG. 3 is maintained in the backward travel state.

FIG. 9 shows an example in which the belt switching means 63 is maintained in the backward travel state.

When the rotation direction switching device 15 (FIG. 2) is placed in the backward travel state, the connecting pin 106 of the belt switching means 63 is positioned to the left of the center line 128.

The connecting arm 107 is formed in a substantial dog leg shape, whereby a concave part as the interference prevention part 118 is formed in the position facing the input shaft 58.

The connecting arm 107 is thereby prevented from interfering with the input shaft 58 when the connecting pin 106 of the belt switching means 63 is positioned to the left of the center line 128.

Furthermore, the spring 108 is connected to the rotary case 81 via the connecting arm 107. The spring 108 is thereby prevented from interfering with the input shaft 58.

The connecting pin 106 of the belt switching means 63 is positioned to the left of the center line 128, whereby the tension force F4 of the spring 108 acts on the connecting arm 107 as indicated by the arrow.

The acting tension force F4 is transmitted as a load to the connecting pin 106 via the connecting arm 107. The transmitted load is transmitted to the switching lever 105 as a load F5 via the connecting pin 106.

The load F5 is transmitted to the rotary case 81 through the switching lever 105, and a rotational force F6 acts on the rotary case 81 as indicated by the arrow.

Figure 10:
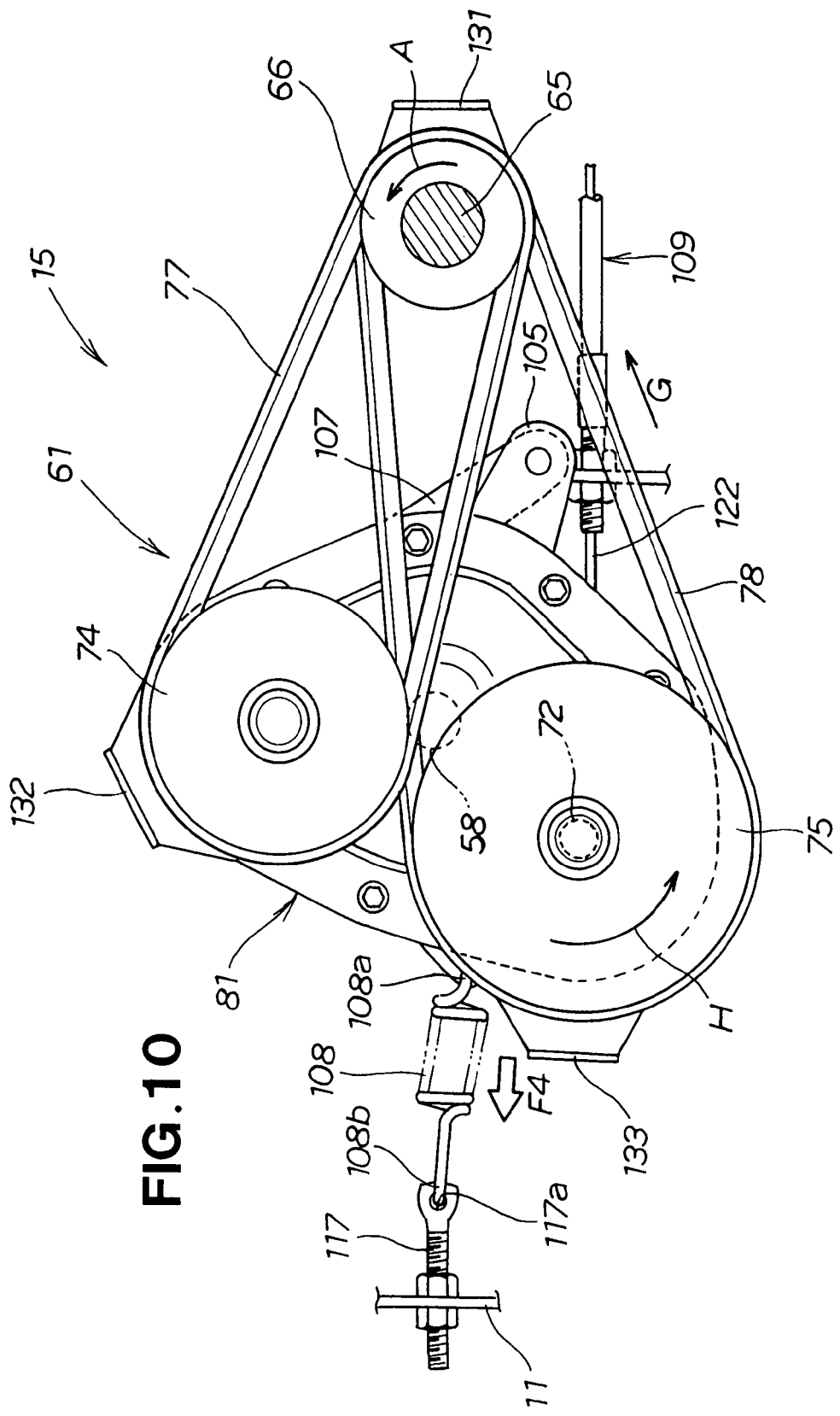
FIG. 10 is a top plan view of an example in which the pulley unit shown in FIG. 2 is maintained in the backward travel state.

FIG. 10 shows an example in which the pulley unit 61 is retained in the backward travel state.

The rotational force F6 (FIG. 9) acts on the rotary case 81 as indicated by the arrow, whereby the rotational force F6 acts on the reverse rotation shaft 72. Specifically, the reverse rotation shaft 72 is pulled in the direction away from the drive shaft 65 by the tension force F4 of the spring 108.

In this arrangement, the tension force F4 is adjusted so that the spring 108 exerts an appropriate tension force on the reverse rotation drive belt 78. The rotary case 81 is thus kept stationary in a state in which the appropriate tension force is applied to the reverse rotation drive belt 78 (tensioned state). The rotary case 81 is maintained in the backward travel state.

Specifically, in the pulley unit 61 in the backward travel state, the reverse rotation drive belt 78 is maintained in the tensioned state, and the forward rotation drive belt 77 is maintained in the relaxed state.

When the reverse rotation drive pulley 67 (FIG. 4) rotates as indicated by the arrow A, the rotation of the reverse rotation drive pulley 67 is thereby transferred to the reverse rotation drive belt 78.

The reverse rotation drive belt 78 is rotated as indicated by the arrow G, and the rotation of the reverse rotation drive belt 78 is transferred to the reverse rotation driven pulley 75. The reverse rotation driven pulley 75 thereby rotates as indicated by the arrow H, and the reverse rotation shaft 72 rotates as indicated by the arrow H.

The forward rotation driven pulley 74 moves towards the forward rotation drive pulley 66. Since the forward rotation drive belt 77 is maintained in the relaxed state, the forward rotation drive pulley 66 runs idle even when the forward rotation drive pulley 66 rotates as indicated by the arrow A. The rotation of the forward rotation drive pulley 66 is thus not transferred to the forward rotation driven pulley 74 via the forward rotation drive belt 77.

The diagram shows a state in which the relaxed forward rotation drive belt 77 is not separated from the forward rotation drive pulley 66 or the forward rotation driven pulley 74, but the forward rotation drive belt 77 actually is separated from the forward rotation drive pulley 66 or the forward rotation driven pulley 74.

The forward rotation drive belt 77 separated from the forward rotation drive pulley 66 or the forward rotation driven pulley 74 is kept from separating by the drive belt stopper 131 and the forward rotation driven belt stopper 132.

As shown in FIG. 7, when the rotation direction switching device 15 is placed in the forward travel state, the forward rotation shaft 71 is pulled away from the drive shaft 65 by the tension force F1 of the spring 108. A state is thereby maintained in which the appropriate tension force is applied to the forward rotation drive belt 77 (tensioned state).

Furthermore, as shown in FIG. 10, when the rotation direction switching device 15 is placed in the backward travel state, the reverse rotation shaft 72 is pulled away from the drive shaft 65 by the tension force F4 of the spring 108. A state is thereby maintained in which the appropriate tension force is applied to the reverse rotation drive belt 78 (tensioned state).

One drive belt selected from the forward rotation drive belt 77 and the reverse rotation drive belt 78 can thus be maintained in the tensioned state by providing the spring 108 to the belt switching means 63. There is therefore no need to provide separate pressuring means for tensioning to the forward rotation drive belt 77 and the reverse rotation drive belt 78.

Figure 11:
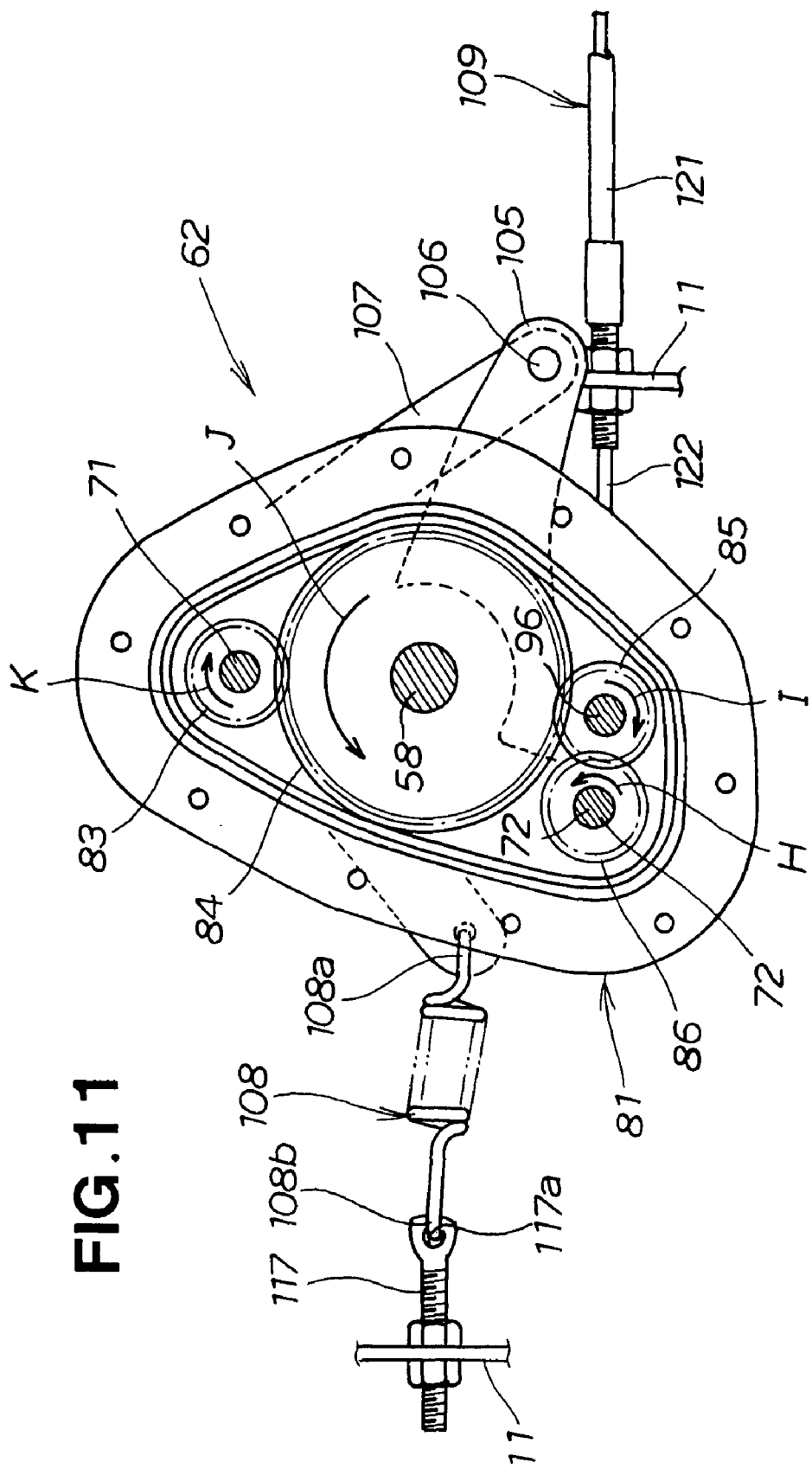
FIG. 11 is a top plan view of an example in which the gear unit shown in FIG. 3 is maintained in the backward travel state.

FIG. 11 shows an example in which the gear unit is maintained in the backward travel state.

The reverse rotation drive gear 86 is rotated integrally with the reverse rotation shaft 72 as indicated by the arrow H by the rotation of the reverse rotation shaft 72 indicated by the arrow H. The idler gear 85 is rotated as indicated by the arrow I by the rotation of the reverse rotation drive gear 86. The driven gear 84 is rotated as indicated by the arrow J by the rotation of the idler gear 85.

The input shaft 58 rotates integrally with the driven gear 84 as indicated by the arrow J, whereby the rotation of the input shaft 58 is transmitted to the left and right crawler travel units 12, 13 via the final drive mechanism 32 shown in FIG. 2. The walk-behind snow remover 10 shown in FIG. 1 thereby travels forward.

The forward rotation drive gear 83 is rotated as indicated by the arrow K by the rotation of the driven gear 84. The forward rotation driven pulley 74 (FIG. 10) rotates integrally with the forward rotation drive gear 83.

Since the forward rotation drive belt 77 is maintained in the relaxed state, the forward rotation driven pulley 74 runs idle.

The input shaft 58 can be switched to the reverse rotation state merely by rotating the rotary case 81, and the structure of the rotation direction switching device 15 can therefore be simplified.

The operation of the rotation direction switching device 15 will next be described based on FIGS. 12 through 18.

Figure 12A:
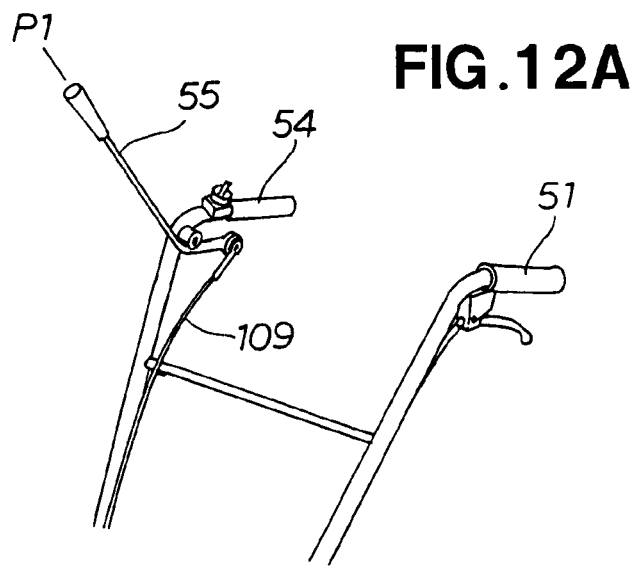
FIGS. 12A and 12B are schematic views showing examples in which the rotation direction switching device according to the first embodiment is maintained in the forward travel state.
Figure 12B:
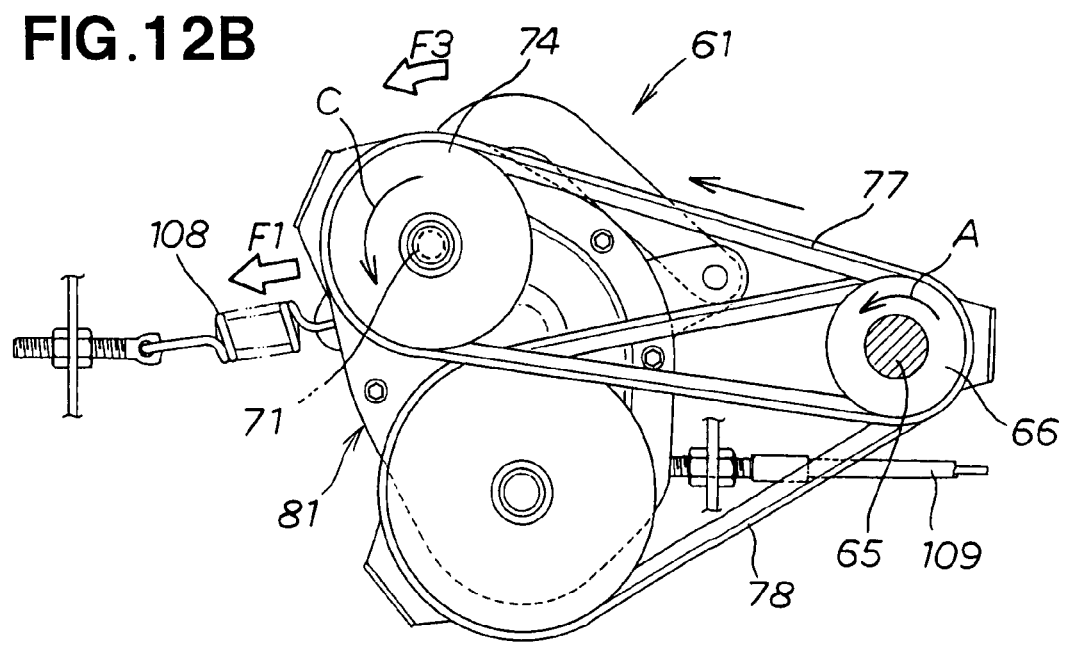

FIGS. 12A and 12B show an example in which the rotation direction switching device is maintained in the forward travel state.

In FIG. 12A, the forward/backward travel switching lever 55 is maintained in the forward travel position P1.

In the pulley unit 61 shown in FIG. 12B, the forward rotation drive belt 77 is maintained in the tensioned state, and the reverse rotation drive belt 78 is maintained in the relaxed state.

The forward rotation drive pulley 66 is rotated as indicated by the arrow A by the driving of the engine 19 (FIG. 1). The rotation of the forward rotation drive pulley 66 is transmitted to the forward rotation driven pulley 74 via the forward rotation drive belt 77.

The forward rotation shaft 71 is rotated as indicated by the arrow C by the rotation of the forward rotation driven pulley 74 as indicated by the arrow C.

The reverse rotation drive pulley 67 shown in FIG. 4 runs idle (idles).

Figure 13A:
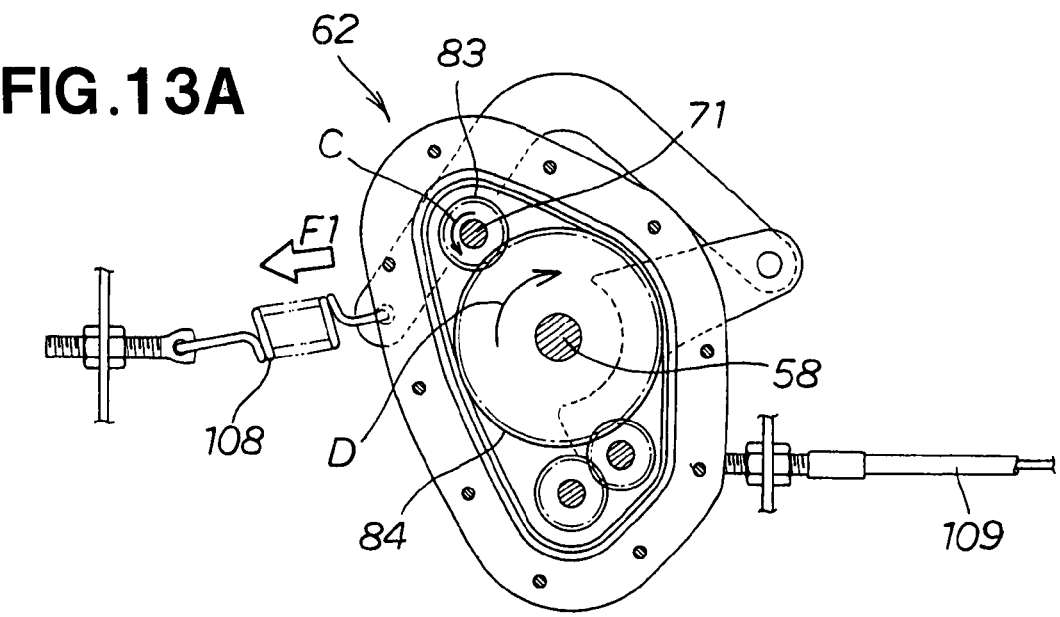
FIGS. 13A and 13B are schematic views showing a state in which the walk-behind snow remover is traveling forward.
Figure 13B:
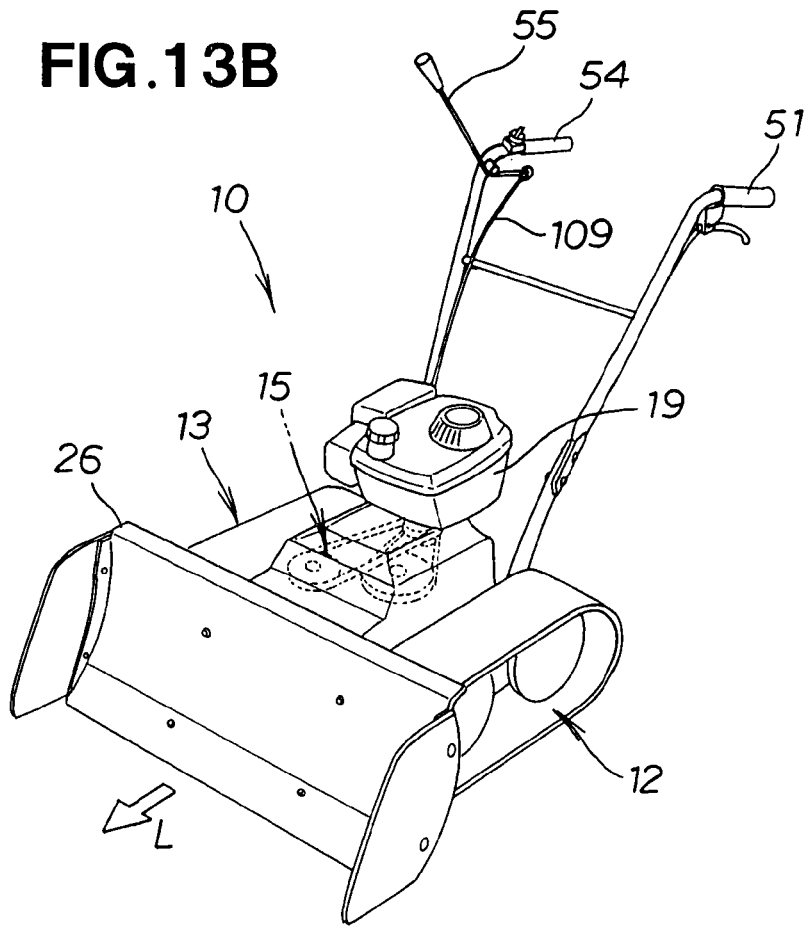

FIGS. 13A and 13B show a state in which the walk-behind snow remover 10 travels forward.

In FIG. 13A, the forward rotation drive gear 83 is rotated integrally with the forward rotation shaft 71 as indicated by the arrow C by the rotation of the forward rotation shaft 71 as indicated by the arrow C. The driven gear 84 is rotated as indicated by the arrow D by the rotation of the forward rotation drive gear 83. The input shaft 58 rotates integrally with the driven gear 84 as indicated by the arrow D.

As shown in FIG. 13B, the walk-behind snow remover 10 travels forward as indicated by the arrow L.

Figure 14A:
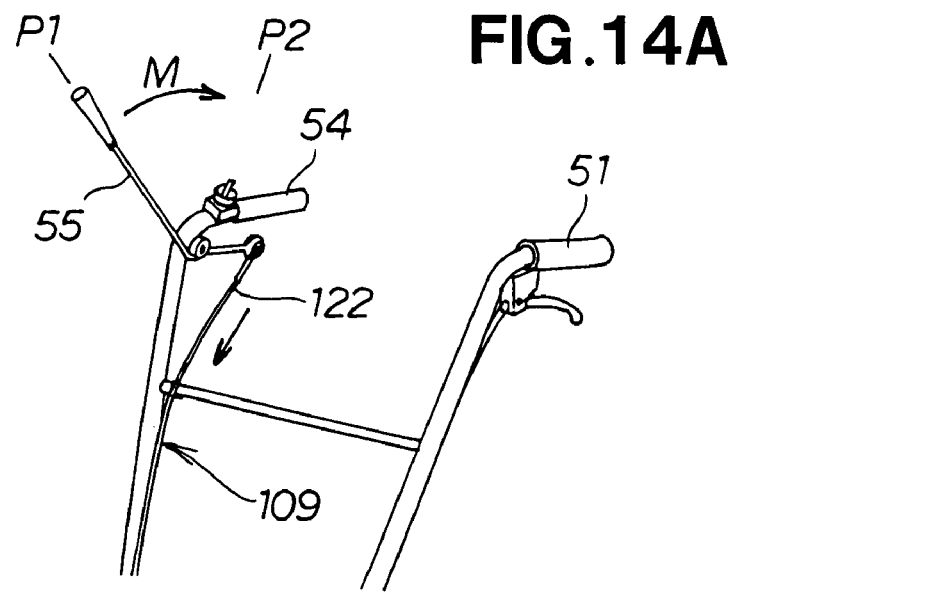
FIGS. 14A and 14B are schematic views showing an example of switching the rotation direction switching device of the first embodiment to the backward travel state.
Figure 14B:
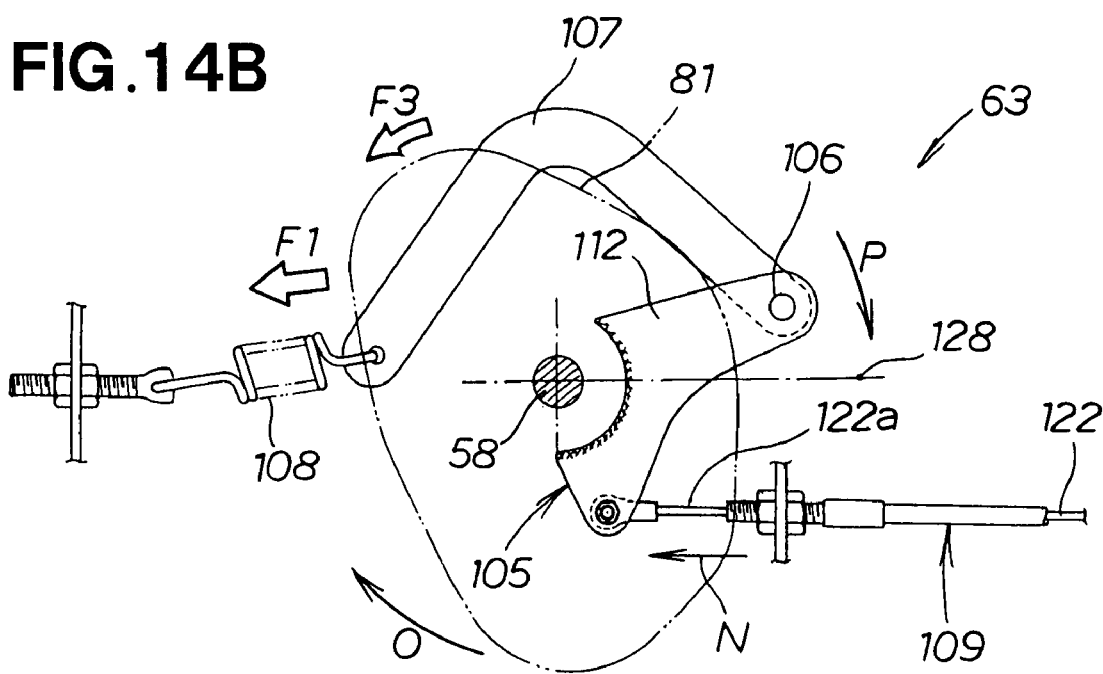

FIGS. 14A and 14B show an example in which the rotation direction switching device is switched to the backward travel state.

In FIG. 14A, the forward/backward travel switching lever 55 is moved from the forward travel position P1 to the backward travel position P2 as indicated by the arrow M. The inner cable 122 of the push-pull cable 109 is pushed forward as indicated by the arrow.

In FIG. 14B, the tension force F1 of the spring- 108 exerts the rotational force F3 on the rotary case 81 as indicated by the arrow.

The front end part 122a of the inner cable 122 is pushed as indicated by the arrow N by the operation of the forward/backward travel switching lever 55. The rotary case 81 is rotated as indicated by the arrow O against the tension force F1 of the spring 108 by the pushing of the front end part 122a. The center of rotation of the rotary case 81 is the input shaft 58.

When the rotary case 81 rotates about the input shaft 58, the second lever 112 of the switching lever 105 pivots about the input shaft 58 as indicated by the arrow P.

The connecting pin 106 moves toward the center line 128 as indicated by the arrow P together with the second end part 112 of the switching lever 105. The connecting pin 106 crosses the center line 128 and moves to the left of the center line 128.

Figure 15A:
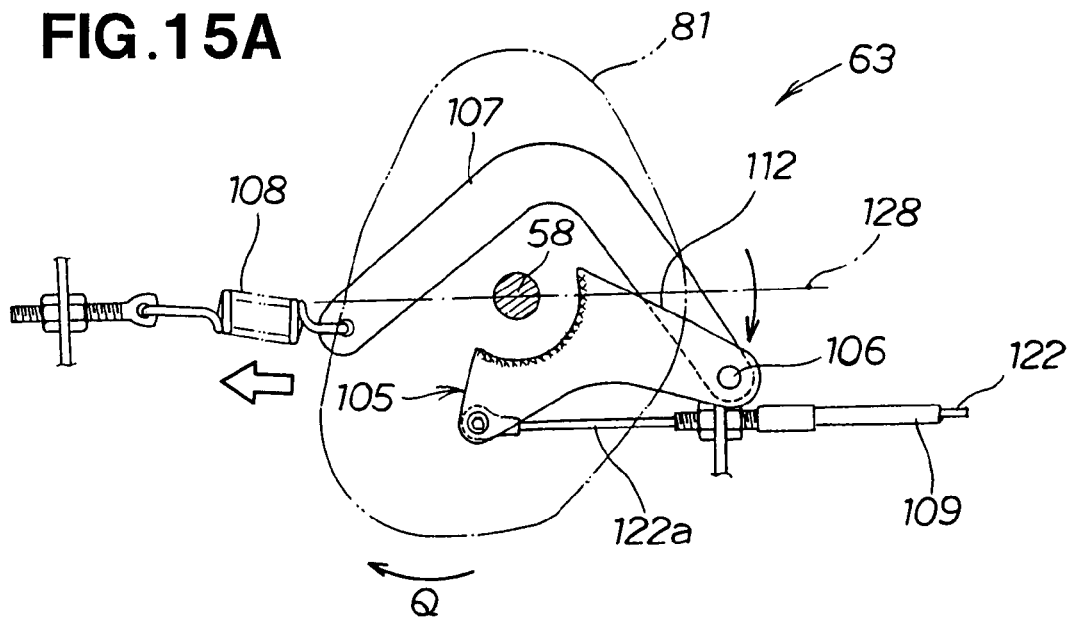
FIGS. 15A and 15B are schematic views showing an example in which the rotation direction switching device of the first embodiment is switched to the backward travel state.
Figure 15B:
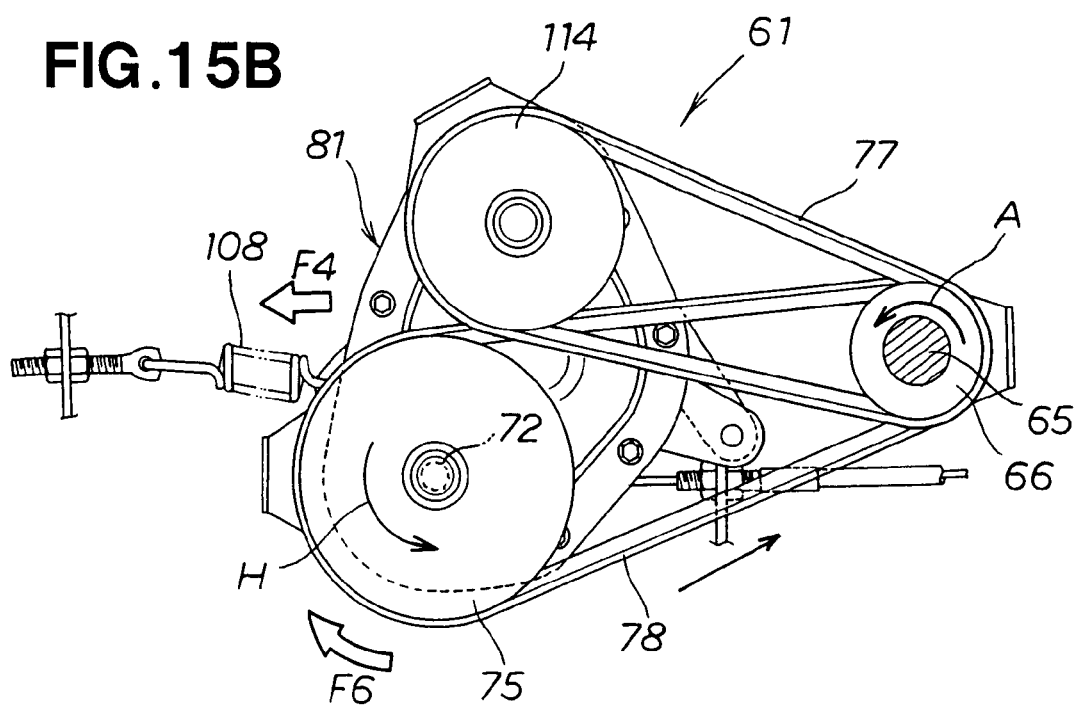

FIGS. 15A and 15B showman example in which the rotation direction switching device is switched to the backward travel state.

In FIG. 15A, when the connecting pin 106 crosses the center line 128 and moves to the left of the center line 128, the rotational force of the rotary case 81 due to the tension force of the spring 108 switches to the direction of the arrow Q (the clockwise direction).

The rotary case 81 is rotated as indicated by the arrow Q by the tension force of the spring 108.

In FIG. 15B, the reverse rotation shaft 72 is pulled away from the drive shaft 65 by the rotation of the rotary case 81. The rotary case 81 is held static in a state in which the appropriate tension force is applied to the reverse rotation drive belt 78 (tensioned state). Specifically, the rotary case 81 is switched to the backward travel state.

In this state, the tension force of the spring 108 is F4, and the rotational force of the rotary case 81 is F6.

The forward rotation drive belt 77 is maintained in the relaxed state.

When the reverse rotation drive pulley 67 (FIG. 4) rotates as indicated by the arrow A, the rotation of the reverse rotation drive pulley 67 is transmitted to the reverse rotation driven pulley 75 via the reverse rotation drive belt 78.

The reverse rotation driven pulley 75 rotates as indicated by the arrow H, and the reverse rotation shaft 72 rotates as indicated by the arrow H.

The forward rotation drive pulley 66 runs idle.

Figure 16A:
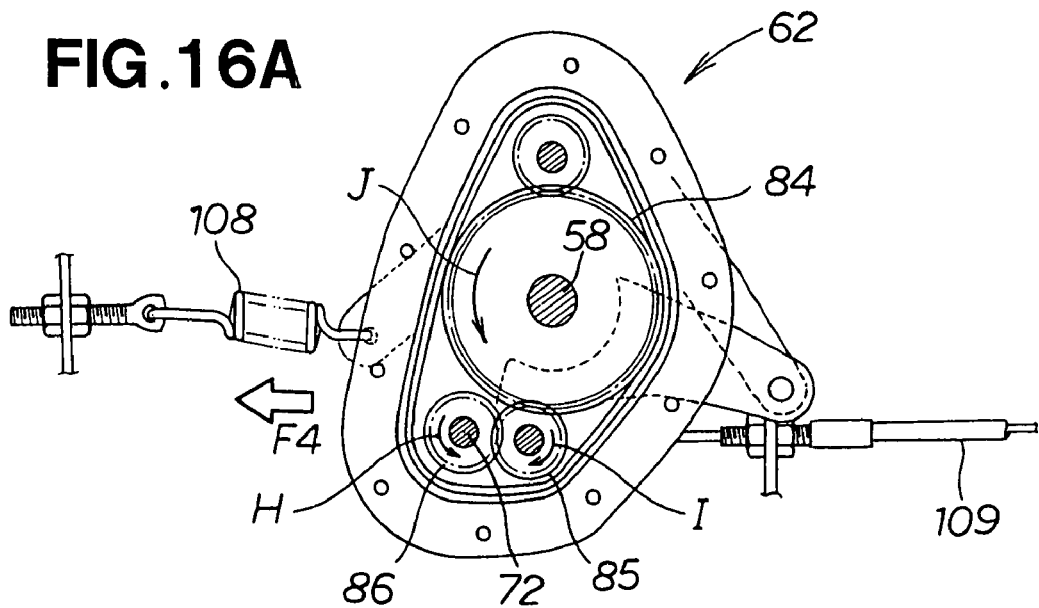
FIGS. 16A and 16B are schematic views showing a state in which the walk-behind snow remover is traveling backward.
Figure 16B:
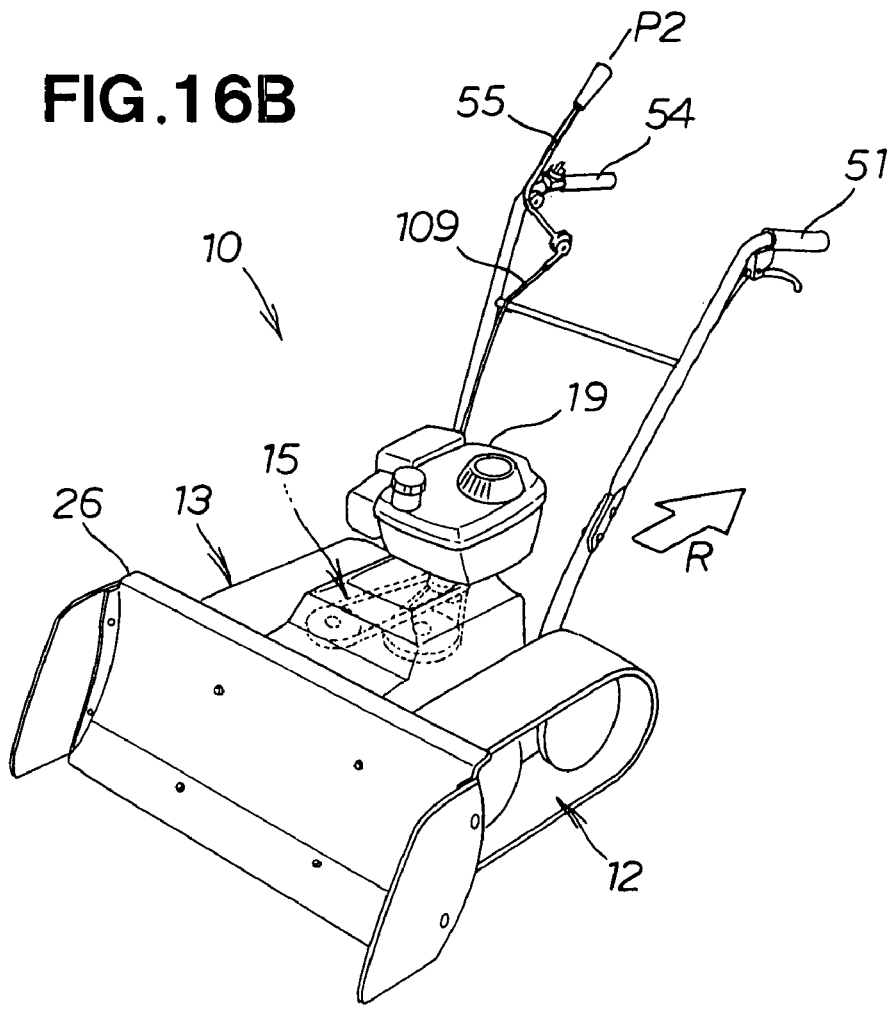

FIGS. 16A and 16B show a state in which the walk-behind snow remover 10 is traveling backward.

In FIG. 16A, the reverse rotation drive gear 86 is rotated integrally with the reverse rotation shaft 72 as indicated by the arrow H by the rotation of the reverse rotation shaft 72 as indicated by the arrow H. The idler gear 85 is rotated as indicated by the arrow I by the rotation of the reverse rotation drive gear 86. The driven gear 84 is rotated as indicated by the arrow J by the rotation of the idler gear 85. The input shaft 58 rotates integrally with the driven gear 84 as indicated by the arrow J.

As shown in FIG. 16B, the walk-behind snow remover 10 travels backward as indicated by the arrow R.

Figure 17A:
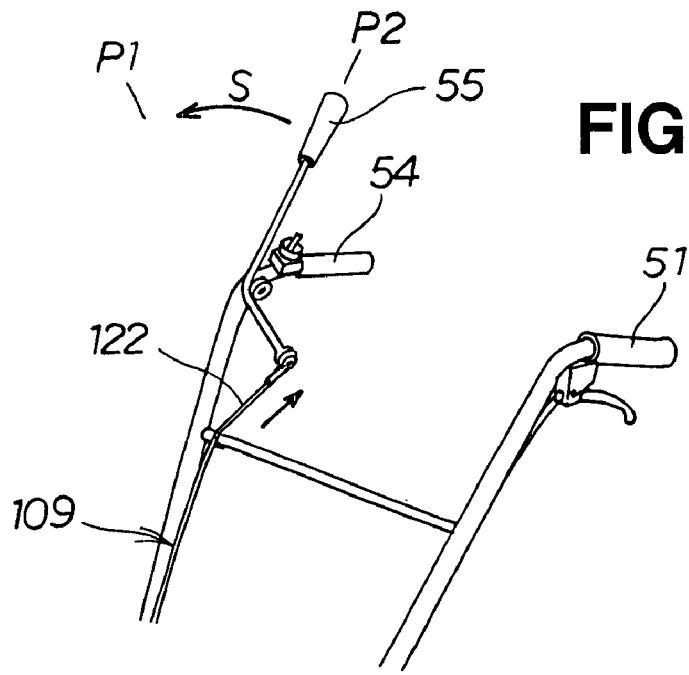
FIGS. 17A and 17B are schematic views showing an example in which the rotation direction switching device according to the first embodiment is switched to the forward travel state.
Figure 17B:
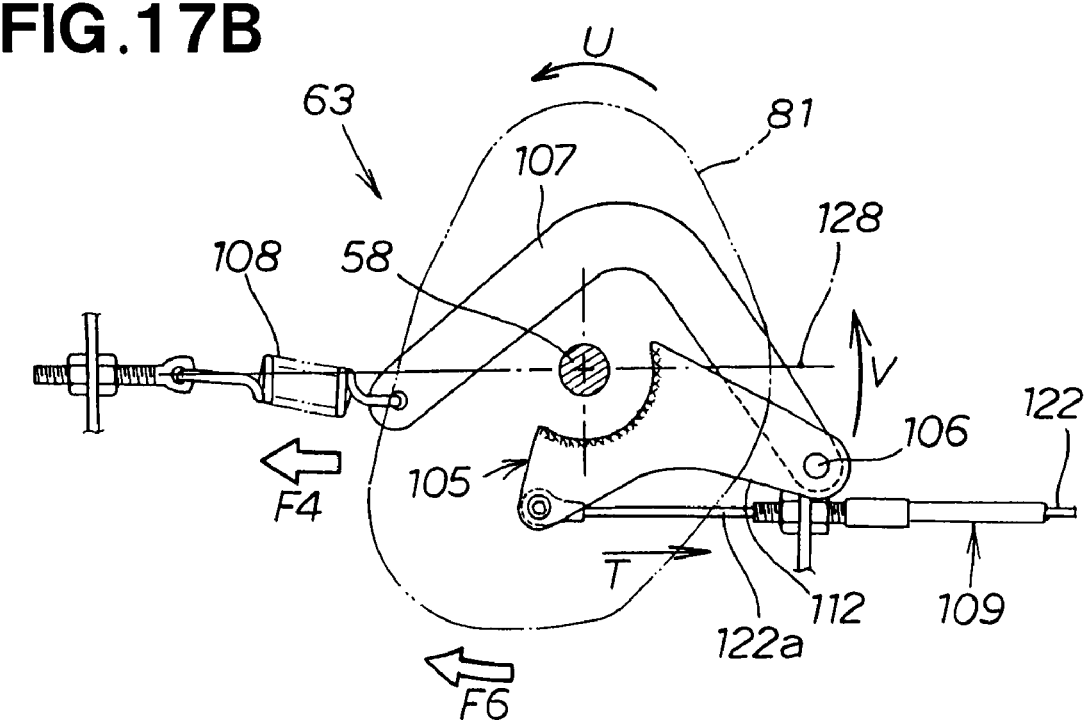
Figure 18:
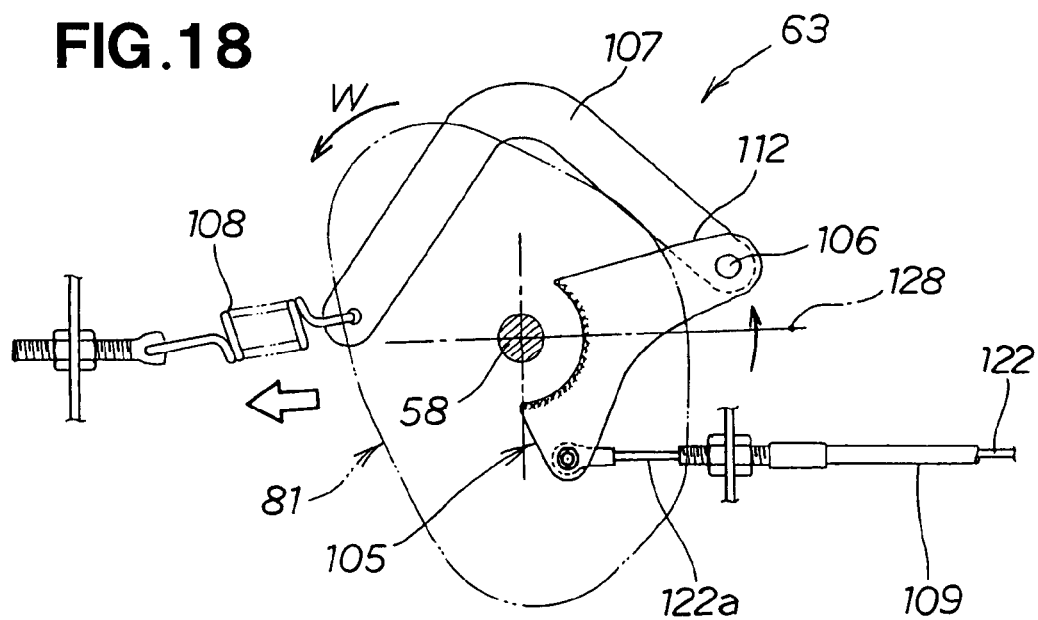
FIG. 18 is a schematic view showing an example in which the rotation direction switching device is switched to the backward travel state.

FIGS. 17A and 17B show an example in which the rotation direction switching device is switched to the forward travel state.

In FIG. 17A, the forward/backward travel switching lever 55 is moved from the backward travel position P2 to the forward travel position P1 as indicated by arrow S.

The inner cable 122 of the push-pull cable 109 is pulled to the rear as indicated by the arrow.

In FIG. 17B, the tension force F4 of the spring 108 exerts the rotational force F6 on the rotary case 81 as indicated by the arrow.

The front end part 122a of the inner cable 122 is pulled as indicated by the arrow T by the operation of the forward/backward travel switching lever 55. The rotary case 81 is rotated as indicated by the arrow U against the tension force F4 of the spring 108 by the pulling of the front end part 122a. The center of rotation of the rotary case 81 is the input shaft 58.

When the rotary case 81 rotates about the input shaft 58, the second end part 112 of the switching lever 105 pivots about the input shaft 58 as indicated by the arrow V.

The connecting pin 106 moves toward the center line 128 as indicated by the arrow V together with the second end part 112. The connecting pin 106 crosses the center line 128 and moves to the right of the center line 128.

FIGS. 18A and 18B show an example in which the rotation direction switching device is switched to the backward travel state.

When the connecting pin 106 crosses the center line 128 and moves to the right of the center line 128, the rotational force of the rotary case 81 due to the tension force of the spring 108 switches to the direction of the arrow W (the counterclockwise direction).

In FIG. 12B, the forward rotation shaft 71 is pulled away from the drive shaft 65 by the rotation of the rotary case 81. The rotary case 81 is held static in a state in which the appropriate tension force is applied to the forward rotation drive belt 77 (tensioned state). The rotary case 81 is maintained in the forward travel state.

In this state, the tension force of the spring 108 is F1, and the rotational force of the rotary case 81 is F3.

The reverse rotation drive belt 78 is maintained in the relaxed state.

According to the description based on FIGS. 12 through 18, maintaining the forward/backward travel switching lever 55 in the forward travel position P1 maintains the forward rotation drive belt 77 in the tensioned state.

The rotation of the forward rotation drive pulley 66 is transmitted to the forward rotation shaft 71 via the forward rotation drive belt 77 and the forward rotation driven pulley 74. The forward rotation shaft 71 rotates as indicated by the arrow C, and the walk-behind snow remover 10 travels forward as indicated by the arrow L.

The rotation direction switching device 15 is switched to the backward travel state by moving the forward/backward travel switching lever 55 from the forward travel position P1 to the backward travel position P2. The reverse rotation drive belt 78 is maintained in the tensioned state.

The rotation of the reverse rotation drive pulley 67 is transmitted to the reverse rotation shaft 72 via the reverse rotation drive belt 78 and the reverse rotation driven pulley 75. The reverse rotation shaft 72 rotates as indicated by the arrow H, and the walk-behind snow remover 10 travels backward as indicated by the arrow R.

Furthermore, the rotation direction switching device 15 is switched to the forward travel state by moving the forward/backward travel switching lever 55 from the backward travel position P2 to the forward travel position P1. The forward rotation drive belt 77 is maintained in the tensioned state. The walk-behind snow remover 10 thereby travels forward as indicated by the arrow L, as described above.

Specifically, the rotation direction switching device 15 makes it possible for one drive belt among the forward rotation drive belt 77 and the reverse rotation drive belt 78 to be switched to the tensioned state by the belt switching means 63, and for the other drive belt to be switched to the relaxed state.

When the forward rotation drive belt 77 is switched to the tensioned state, the walk-behind snow remover 10 travels forward.

When the reverse rotation drive belt 78 is switched to the tensioned state, the walk-behind snow remover 10 travels backward.

The walk-behind snow remover 10 can thereby be switched to the forward travel state or the backward travel state without operating a clutch, merely by switching the forward rotation drive belt 77 or the reverse rotation drive belt 78 to the tensioned state through the use of the belt switching means 63.

The walk-behind snow remover 10 can thereby be smoothly switched between forward travel and backward travel.

Since the walk-behind snow remover 10 can be switched between forward travel and backward travel merely by switching the forward rotation drive belt 77 or the reverse rotation drive belt 78 to the tensioned state and the relaxed state, the structure of the rotation direction switching device can be simplified.

First and second modifications of the rotation direction switching device 15 according to the first embodiment will next be described based on FIGS. 19 and 20.

Figure 19:
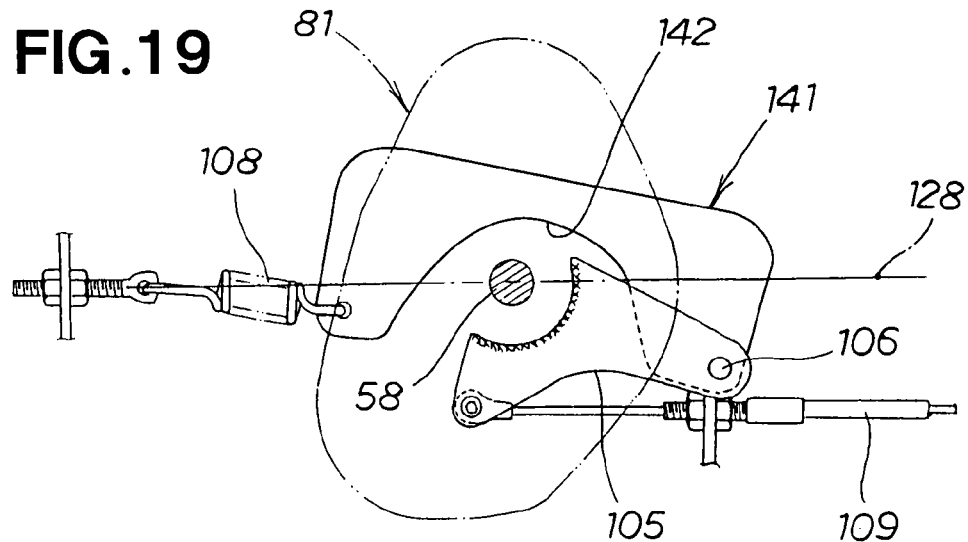
FIG. 19 is a schematic view showing a first modification of the rotation direction switching device according to the first embodiment.

FIG. 19 shows the first modification of the rotation direction switching device according to the first embodiment.

The first modification has the same structure as the rotation direction switching device 15 according to the first embodiment, except that a connecting member 141 is used instead of the connecting arm 107 of the first embodiment.

The external shape of the connecting member 141 is substantially rectangular, and an interference prevention part 142 is formed therein at the position facing the input shaft 58.

The interference prevention part 142 is a part formed in a concave shape so as to accommodate the input shaft 58.

The connecting member 141 can thereby be prevented from interfering with the input shaft 58 when the connecting pin 106 of the belt switching means 63 is positioned to the left of the center line 128.

Specifically, the same effects as those of the first embodiment can be obtained through the first modification.

Figure 20:
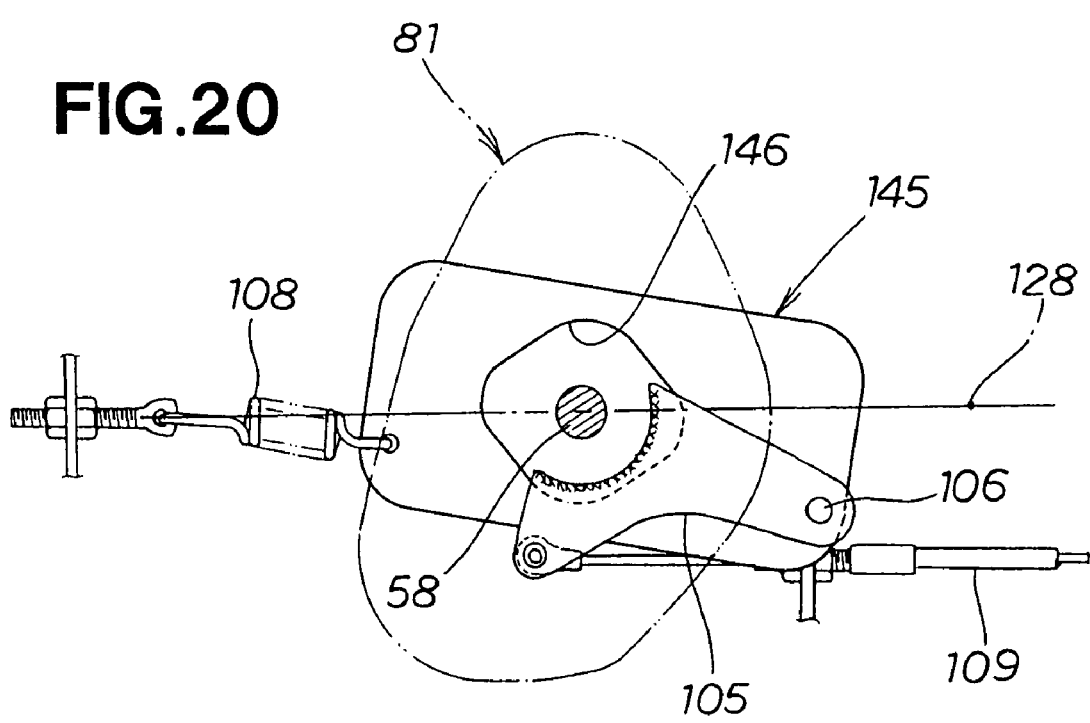
FIG. 20 is a schematic view showing a second modification of the rotation direction switching device according to the first embodiment.

FIG. 20 shows a second modification of the rotation direction switching device according to the first embodiment.

A second modification has the same structure as the rotation direction switching device 15 of the first embodiment, except that a connecting member 145 is used instead of the connecting arm 107 of the first embodiment.

The external shape of the connecting member 145 is substantially rectangular, and an interference prevention part 146 for preventing interference with the input shaft 58 is formed at the center of the connecting member 145.

The interference prevention part 146 is an open part formed so as to accommodate the input shaft 58.

Specifically, the interference prevention part 146 is formed so that the connecting member 145 does not interfere with the input shaft 58 in each state when the connecting pin 106 of the belt switching means 63 is positioned to the left and right of the center line 128.

Specifically, the same effects as those of the first embodiment can be obtained through the second modification.

The rotation direction switching device 150 according to the second embodiment will next be described based on FIGS. 21 through 23. In the second embodiment, the same reference symbols are used to indicate members that are the same or similar to those of the rotation direction switching device 15 of the first embodiment, and no description thereof will be given.

FIG. 21 shows the rotation direction switching device of the second embodiment.

The rotation direction switching device 150 is disposed in the path of drive power transmission from the engine 19 shown in FIG. 1 to the input shaft 58, and switches the rotation direction of the input shaft 58 to forward rotation and reverse rotation.

The rotation direction switching device 150 has a gear unit (gear mechanism) 151 connected to the travel clutch 18; a pulley unit 152 connected to the gear unit 151; and a belt switching means (not shown) for switching the connection of the pulley unit 152.

The belt switching means as the same structure as the belt switching means 63 of the first embodiment.

The gear unit 151 has a rotary case (rotary body) 154 that is supported so as to be able to rotate about the drive shaft 65 as a rotary shaft; a drive gear 155 provided to the drive shaft 65; a forward rotation driven gear 157 provided to a forward rotation shaft (first other shaft) 156 that meshes with the drive gear 155; and a reverse rotation driven gear 159 provided to the reverse rotation shaft (second other shaft) 158 that meshes with the forward rotation driven gear 157.

The rotary case 154 has a case body 161 for housing the drive gear 155, the forward rotation driven gear 157, and the reverse rotation driven gear 159; and also has a case cover 163 (see FIG. 22B) for blocking the open part 162 of the case body 161.

The case cover 163 is bolted to the opening edge part 164 of the case body 161.

In FIG. 21, the case cover 163 is removed to facilitate understanding of the gear unit 151.

The pulley unit 152 has a forward rotation shaft 156 for supporting the forward rotation driven gear 157; a forward rotation drive pulley 166 provided to the forward rotation shaft 156; a reverse rotation shaft 158 for supporting the reverse rotation driven gear 159; a reverse rotation drive pulley 167 provided to the reverse rotation shaft 158; a forward rotation driven pulley 171 and a reverse rotation driven pulley 172 provided to the input shaft 58; a forward rotation drive belt 174 that extends between the forward rotation drive pulley 166 and the forward rotation driven pulley 171; and a reverse rotation drive belt 175 that extends between the reverse rotation drive pulley 167 and the reverse rotation driven pulley 172.

The pulley unit 152 enables the rotation of the forward rotation drive pulley 166 to be transmitted to the forward rotation driven pulley 171 via the forward rotation drive belt 174 when the forward rotation drive belt 174 is maintained in the tensioned state.

In a state in which the forward rotation drive belt 174 is maintained in the relaxed state, the forward rotation drive pulley 166 can be idly rotated. The rotation of the forward rotation drive pulley 166 is thereby not transmitted to the forward rotation driven pulley 171 via the forward rotation drive belt 174.

Furthermore, the pulley unit 152 enables the rotation of the reverse rotation drive pulley 167 to be transmitted to the reverse rotation driven pulley 172 via the reverse rotation drive belt 175 when the reverse rotation drive belt 175 is maintained in the tensioned state.

When the reverse rotation drive belt 175 is maintained in the relaxed state, the reverse rotation drive pulley 167 can be idly rotated. The rotation of the reverse rotation drive pulley 167 is thereby not transmitted to the reverse rotation driven pulley 172 via the reverse rotation drive belt 175.

Figure 22A:
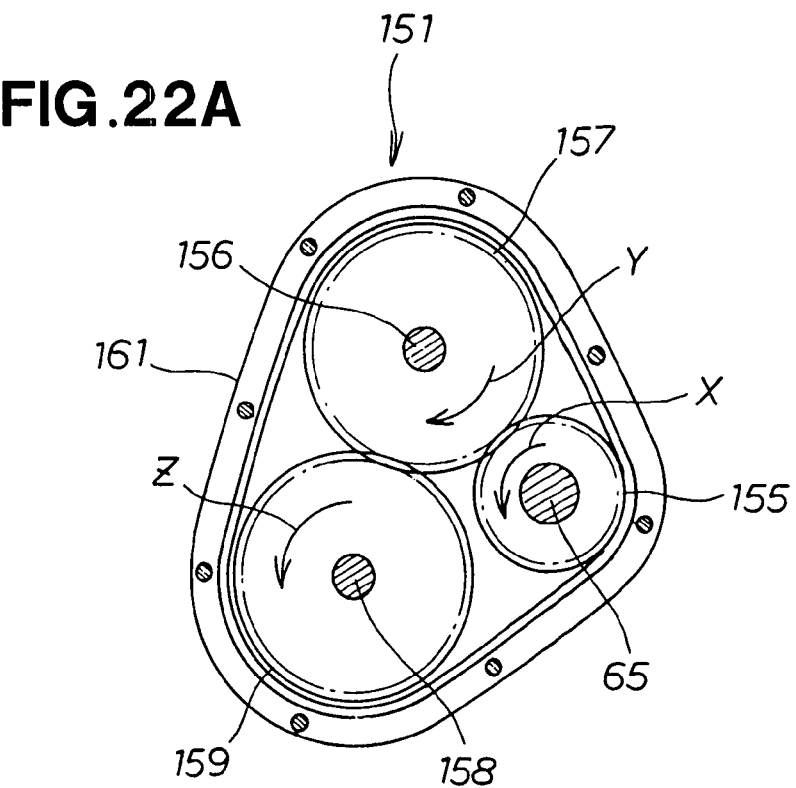
FIGS. 22A and 22B are schematic views showing an example in which the rotation direction switching device shown in FIG. 21 is maintained in the forward travel state.
Figure 22B:
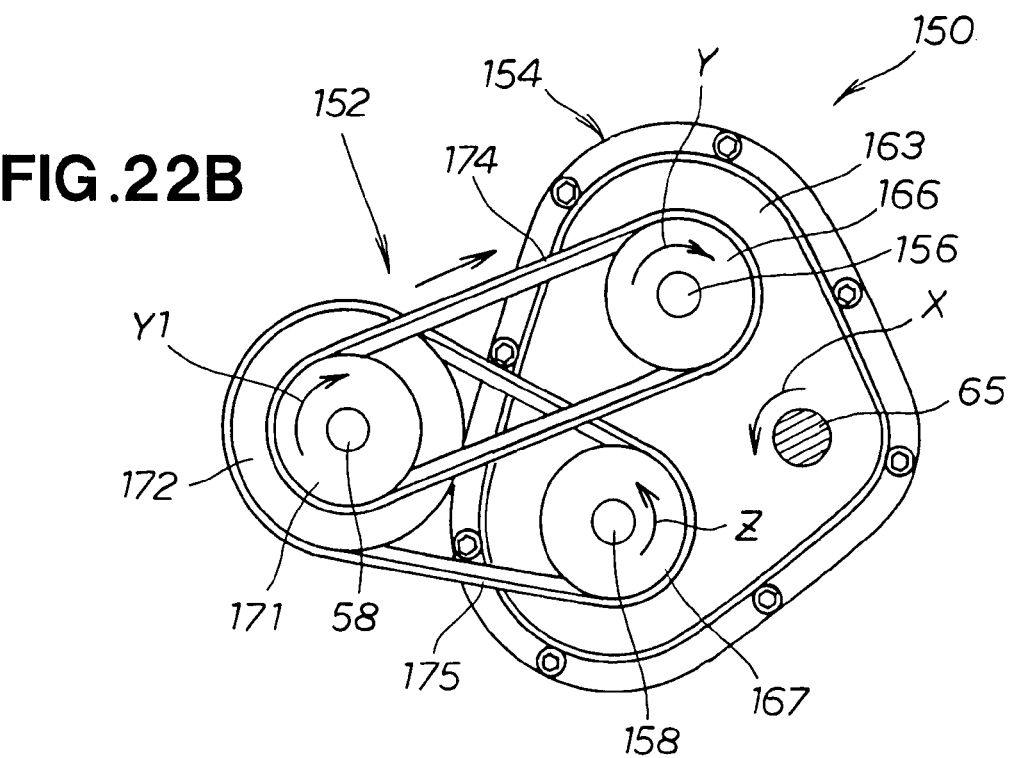

FIGS. 22A and 22B show an example in which the rotation direction switching device according to the second embodiment is maintained in the forward travel state.

In FIG. 22A, when the engine 19 shown in FIG. 1 is driven, and the drive shaft 65 is rotated as indicated by the arrow X, the drive gear 155 rotates together with the drive shaft 65 as indicated by the arrow X.

The forward rotation driven gear 157 is rotated as indicated by the arrow Y by the rotation of the drive gear 155. The reverse rotation driven gear 159 is rotated as indicated by the arrow Z by the rotation of the forward rotation driven gear 157.

In the pulley unit 152 shown in FIG. 22B, the forward rotation drive belt 174 is maintained in the tensioned state, and the reverse rotation drive belt 175 is maintained in the relaxed state.

The rotation of the forward rotation driven gear 157 is transmitted to the forward rotation drive pulley 166 via the forward rotation shaft 156. The forward rotation drive pulley 166 rotates as indicated by the arrow Y.

The rotation of the forward rotation drive pulley 166 is transmitted to the forward rotation driven pulley 171 via the forward rotation drive belt 174. The forward rotation driven pulley 171 rotates as indicated by the arrow Y1.

The input shaft 58 rotates integrally with the forward rotation driven pulley 171 as indicated by the arrow Y1, whereby the rotation of the input shaft 58 is transmitted to the left and right crawler travel units 12, 13 via the final drive mechanism 32 shown in FIG. 21. The walk-behind snow remover 10 can thereby be caused to travel forward.

The rotation of the reverse rotation driven gear 159 (FIG. 22A) is transmitted to the reverse rotation drive pulley 167 via the reverse rotation shaft 158.

Since the reverse rotation drive belt 175 is maintained in the relaxed state, the reverse rotation drive pulley 167 runs idle as indicated by the arrow Z.

Figure 23A:
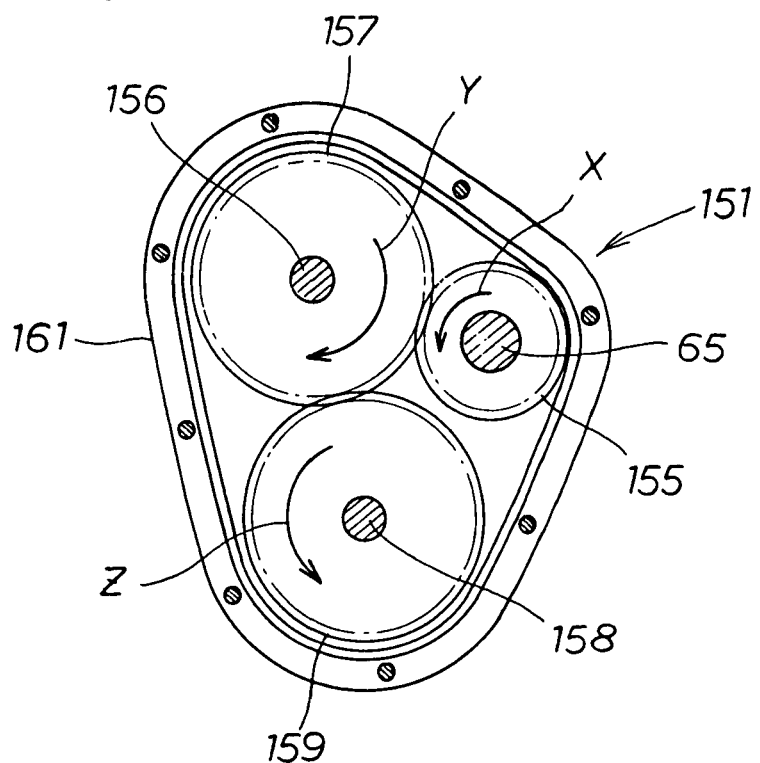
FIGS. 23A and 23B are schematic views showing an example in which the rotation direction switching device shown in FIG. 21 is maintained in the backward travel state.
Figure 23B:
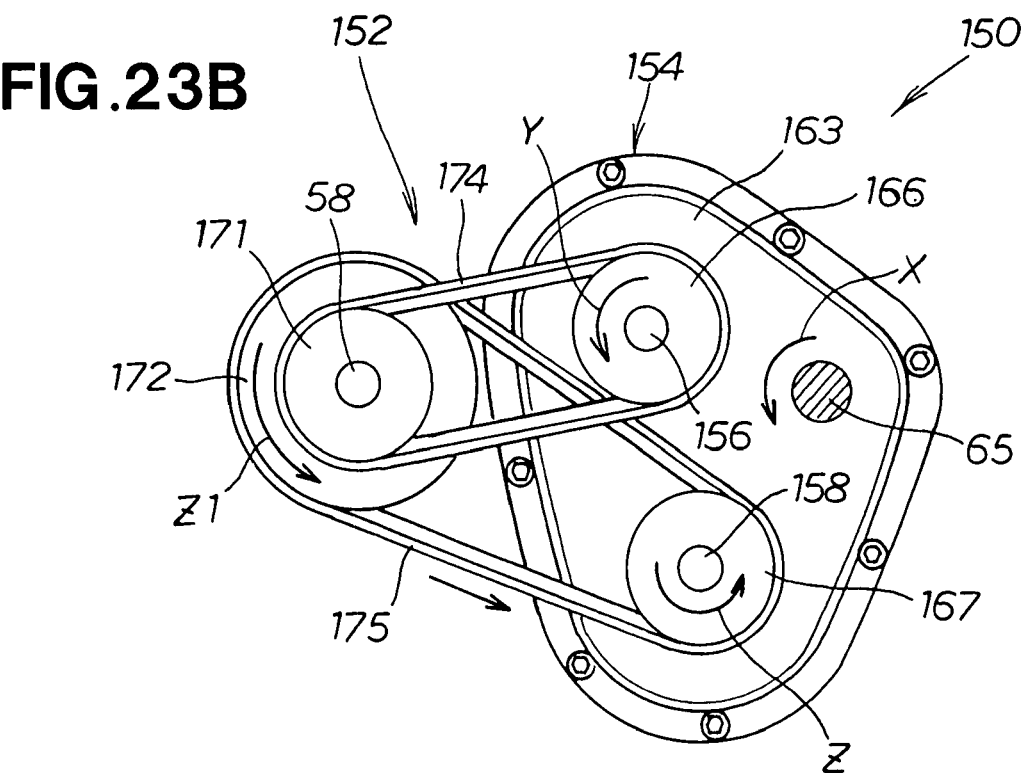

FIGS. 23A and 23B show an example in which the rotation direction switching device of the second embodiment is maintained in the backward travel state.

In FIG. 23A, when the engine 19 shown in FIG. 1 is driven, and the drive shaft 65 is rotated as indicated by the arrow X, the drive gear 155 rotates together with the drive shaft 65 as indicated by the arrow X.

The forward rotation driven gear 157 is rotated as indicated by the arrow Y by the rotation of the drive gear 155. The reverse rotation driven gear 159 is rotated as indicated by the arrow Z by the rotation of the forward rotation driven gear 157.

In FIG. 23B, the reverse rotation drive belt 175 is maintained in the tensioned state, and the forward rotation drive belt 174 is maintained in the relaxed state.

The rotation of the reverse rotation driven gear 159 (FIG. 23A) is transmitted to the reverse rotation drive pulley 167 via the reverse rotation shaft 158. The reverse rotation drive pulley 167 rotates as indicated by the arrow Z.

The rotation of the reverse rotation drive pulley 167 is transmitted to the reverse rotation driven pulley 172 via the reverse rotation drive belt 175.

The reverse rotation driven pulley 172 rotates as indicated by the arrow Z1.

The input shaft 58 rotates integrally with the reverse rotation driven pulley 172 as indicated by the arrow Z1, whereby the rotation of the input shaft 58 is transmitted to the left and right crawler travel units 12, 13 via the final drive mechanism 32 shown in FIG. 21. The walk-behind snow remover 10 can thereby be caused to travel backward.

The rotation of the forward rotation driven gear 157 (FIG. 23A) is transmitted to the forward rotation drive pulley 166 via the forward rotation shaft 156.

Since the forward rotation drive belt 174 is maintained in the relaxed state, the forward rotation drive pulley 166 runs idle as indicated by the arrow Y.

Since the engine 19 rotates at a relatively high speed, the rotation of the engine 19 must be decelerated to the desired speed by a gear mechanism or the like.

Therefore, the forward rotation drive pulley 166 is provided to the forward rotation shaft 156, and the reverse rotation drive pulley 167 is provided to the reverse rotation shaft 158 in the second embodiment.

The diameter of the forward rotation driven gear 157 provided to the forward rotation drive pulley 166, or the reverse rotation driven gear 159 provided to the reverse rotation drive pulley 167 can be increased in order to decelerate the forward rotation and reverse rotation drive pulleys 166, 167 to the desired speed.

The forward rotation and reverse rotation drive pulleys 166, 167 can thereby be separated to prevent interference with each other when the forward rotation driven gear 157 and the reverse rotation driven gear 159 are meshed with each other.

The forward rotation driven gear 157 and the reverse rotation driven gear 159 are thus meshed with each other, whereby the forward rotation driven gear 157 can also be used as an idler gear for reversely rotating the reverse rotation driven gear 159.

Consequently, the number of gears provided to the gear unit 151 can be reduced by one.

The same effects as those of the first embodiment can also be obtained through the rotation direction switching device 150 of the second embodiment.

In the embodiments, an example was described in which the rotation direction switching devices 15, 150 were applied to a walk-behind snow remover 10, but this configuration is not limiting, and the present invention can also be applied to a walk-behind lawn mower, cultivator, or other utility vehicle in which a rotation direction switching device is necessary.

The present invention is suitable for application to a utility vehicle, equipment, or the like that comprises a rotation direction switching device for switching the rotation direction of a drive shaft to forward rotation and reverse rotation.

Obviously, various minor changes and modifications of the present invention are possible in light of the above teaching. It is therefore to be understood that within the scope of the appended claims the invention may be practiced otherwise than as specifically described.

What is claimed is:

1. A rotation direction switching device that is disposed in a drive power transmission path from a drive power source to a drive shaft and is used for switching a rotation direction of the drive shaft to forward rotation and reverse rotation, the rotation direction switching device comprising:

a forward rotation drive pulley and a reverse rotation drive pulley connected to an output shaft of the drive power source;

a forward rotation driven pulley and a reverse rotation driven pulley connected to the drive shaft;

a forward rotation drive belt trained around the forward rotation drive pulley and the forward rotation driven pulley;

a reverse rotation drive belt trained around the reverse rotation drive pulley and the reverse rotation driven pulley;

belt switching means for switching one drive belt among the forward rotation drive belt and the reverse rotation drive belt to a tensioned state and the other drive belt to a relaxed state; and a gear mechanism for forwardly rotating the drive shaft when the forward rotation drive belt is switched to the tensioned state, and reversely rotating the drive shaft when the reverse rotation drive belt is switched to the tensioned state, wherein the belt switching means further comprises a connecting member connected to a switching lever that is secured to a rotary body and to a spring, the connecting member rotating via a connector pin and having an interference prevention part formed so as to prevent interference with a rotary shaft that serves a center of rotation of the rotary body, wherein the interference prevention part is a concave part of the connecting member formed in a position facing the drive shaft, wherein the spring is additionally connected to a fixed frame body, and wherein the spring has a tension force configured to urge the rotary body in a first direction to maintain one of the forward rotation drive belt and the reverse rotation drive belt in a tensioned state wherein when the rotary body is rotated against the tension force of the spring by more than a predetermined amount in a second direction to switch the other of the forward rotation drive belt and the reverse rotation drive belt to a tensioned state, the tension force acts to urge the rotary body in the second direction.

2. The switching device of claim 1, wherein one of the forward rotation and reverse rotation drive pulleys as a group and the forward rotation and reverse rotation driven pulleys as a group is provided to a single shaft, and the other of the two groups is provided to a first or second shaft, and the first and second shafts are provided to the rotary body that is capable of rotating, such that one of the first and second shafts separates from the single shaft, and the other of the first and second shafts approaches the single shaft, the drive belt on the pulley of one of the shafts being maintained in the tensioned state by separation of the one shaft from the single shaft, the drive belt on the pulley of the other shaft being maintained in the relaxed state by the approaching of the other shaft to the single shaft.

3. The switching device of claim 2, wherein the spring is configured for maintaining in the tensioned state the drive belt on the pulley of the one shaft, and wherein the spring is connected to the rotary body via the connecting member.

4. The switching device according to claim 2, wherein the pulley provided to the single shaft comprises the forward rotation and reverse rotation drive pulleys.

5. The switching device according to claim 2, wherein the pulleys provided to the first and second shafts comprise the forward rotation and reverse rotation drive pulleys.

* * * * *